(12) United States Patent
Anzai

(10) Patent No.: US 8,380,673 B2
(45) Date of Patent: Feb. 19, 2013

(54) STORAGE SYSTEM

(75) Inventor: Tomoya Anzai, Ebina (JP)

(73) Assignee: Hitachi, Ltd., Tokyo (JP)

( * ) Notice: Subject to any disclaimer, the term of this patent is extended or adjusted under 35 U.S.C. 154(b) by 942 days.

(21) Appl. No.: 12/128,160

(22) Filed: May 28, 2008

(65) Prior Publication Data

US 2009/0228532 A1    Sep. 10, 2009

(30) Foreign Application Priority Data

Mar. 7, 2008 (JP) ................................. 2008-058793

(51) Int. Cl.
*G06F 17/00* (2006.01)

(52) U.S. Cl. ......... 707/655; 707/626; 707/641; 707/661

(58) Field of Classification Search .................. None
See application file for complete search history.

(56) References Cited

U.S. PATENT DOCUMENTS

| | | | |
|---|---|---|---|
| 7,383,463 B2 * | 6/2008 | Hayden et al. ............... 714/4.11 |
| 2004/0186900 A1 | 9/2004 | Nakano et al. | |
| 2004/0267830 A1 * | 12/2004 | Wong et al. ................... 707/200 |
| 2004/0268035 A1 * | 12/2004 | Ueno ............................. 711/112 |
| 2005/0182797 A1 * | 8/2005 | Adkins et al. ................. 707/200 |
| 2006/0174075 A1 | 8/2006 | Sutoh | |
| 2007/0083482 A1 * | 4/2007 | Rathi et al. ........................ 707/1 |
| 2007/0220071 A1 | 9/2007 | Anzai et al. | |
| 2007/0260842 A1 * | 11/2007 | Faibish et al. ................. 711/170 |
| 2007/0277012 A1 * | 11/2007 | Hara et al. ..................... 711/162 |

* cited by examiner

*Primary Examiner* — Pierre Vital
*Assistant Examiner* — Mohammad S Rostami
(74) *Attorney, Agent, or Firm* — Antonelli, Terry, Stout & Kraus, LLP.

(57) ABSTRACT

In a storage system in which plural end servers 104, intermediate servers 103 and clients 101 are connected to each other via a network 105, when a migration-source end server 104 transfers file-level data to a migration-destination end server 104 via the intermediate server 103, the migration-source end server 104 also transfers data in a differential volume simultaneously, and the migration-destination end sever 104 reconstructs data in a snapshot volume based on the transferred data and transfers response information regarding the reconstructed data to the client 101.

6 Claims, 26 Drawing Sheets

FIG.6

| BLOCK ADDRESS | fs0-snap0 | | fs0-snap1 | | ... | fs0-snap(n-1) | |
|---|---|---|---|---|---|---|---|
| | VOLUME | BLOCK | VOLUME | BLOCK | | VOLUME | BLOCK |
| 0 | 1 | 32 | 0 | 0 | ... | NONE | NONE |
| ⋮ | ⋮ | ⋮ | ⋮ | ⋮ | ... | ⋮ | ⋮ |
| t | 1 | 108 | 1 | 94 | ... | NONE | NONE |
| ⋮ | ⋮ | ⋮ | ⋮ | ⋮ | ... | ⋮ | ⋮ |
| m-1 | 1 | 276 | 0 | 0 | ... | NONE | NONE |

FIG.9

| SHARE ID | SERVER ID | SHARE NAME |
|---|---|---|
| 0 | 0 | FS0 |
| 1 | 0 | FS0-SNAP0 |
| 2 | 1 | FS1 |
| 3 | 1 | FS1-SNAP0 |

FIG.10

| SERVER ID | SERVER NAME | IP ADDRESS |
|---|---|---|
| 0 | NAS0 | 192.168.10.1 |
| 1 | NAS1 | 192.168.10.2 |

FIG.11

| SHARE ID | GNS PATH NAME | SERVER ID | SHARE PATH NAME |
|---|---|---|---|
| 0 | /gns/node0 | 0 | /mnt/fs0 |
| 1 | /gns/node0-snap0 | 0 | /mnt/fs0-snap0 |
| 2 | /gns/node1 | 1 | /mnt/fs1 |
| 3 | /gns/node1-snap0 | 1 | /mnt/fs1-snap0 |

| MIGRATION-SOURCE OID | MIGRATION-DESTINATION OID |
|---|---|
|  |  |
|  |  |
|  |  |

| SHARED ID | LOCAL OID |
|---|---|

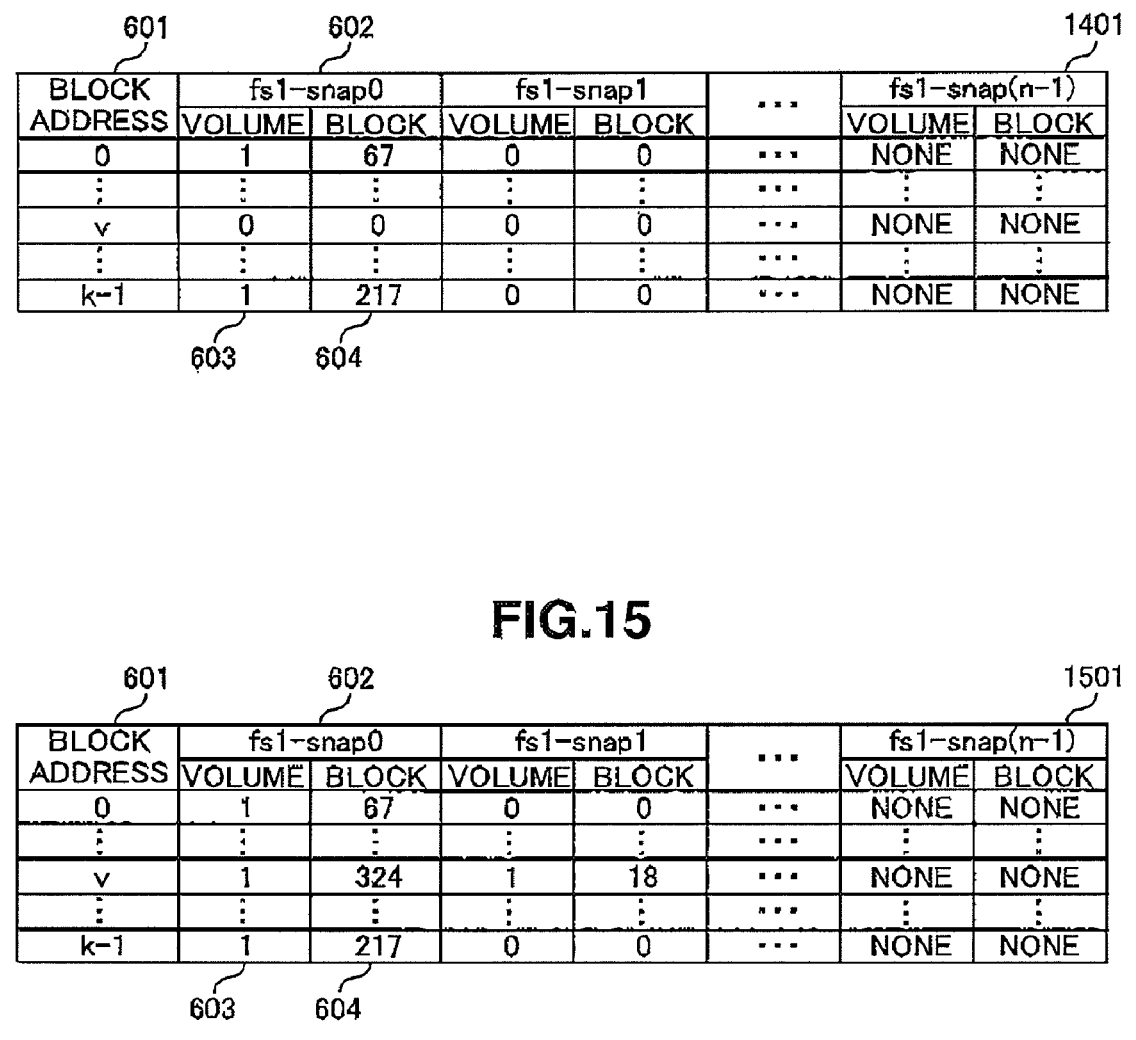

| BLOCK ADDRESS | fs1-snap0 | | fs1-snap1 | | ... | fs1-snap(n-1) | |
|---|---|---|---|---|---|---|---|
| | VOLUME | BLOCK | VOLUME | BLOCK | | VOLUME | BLOCK |
| 0 | 1 | 67 | 0 | 0 | ... | NONE | NONE |
| ⋮ | ⋮ | ⋮ | ⋮ | ⋮ | ... | ⋮ | ⋮ |
| v | 0 | 0 | 0 | 0 | ... | NONE | NONE |
| ⋮ | ⋮ | ⋮ | ⋮ | ⋮ | ... | ⋮ | ⋮ |
| k-1 | 1 | 217 | 0 | 0 | ... | NONE | NONE |

FIG.15

| BLOCK ADDRESS | fs1-snap0 | | fs1-snap1 | | ... | fs1-snap(n-1) | |
|---|---|---|---|---|---|---|---|
| | VOLUME | BLOCK | VOLUME | BLOCK | | VOLUME | BLOCK |
| 0 | 1 | 67 | 0 | 0 | ... | NONE | NONE |
| ⋮ | ⋮ | ⋮ | ⋮ | ⋮ | ... | ⋮ | ⋮ |
| v | 1 | 324 | 1 | 18 | ... | NONE | NONE |
| ⋮ | ⋮ | ⋮ | ⋮ | ⋮ | ... | ⋮ | ⋮ |
| k-1 | 1 | 217 | 0 | 0 | ... | NONE | NONE |

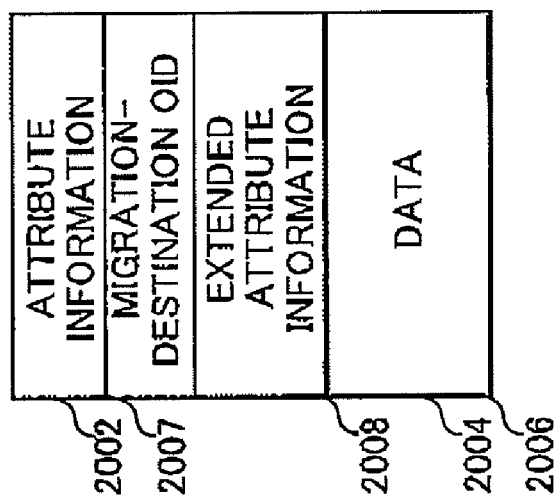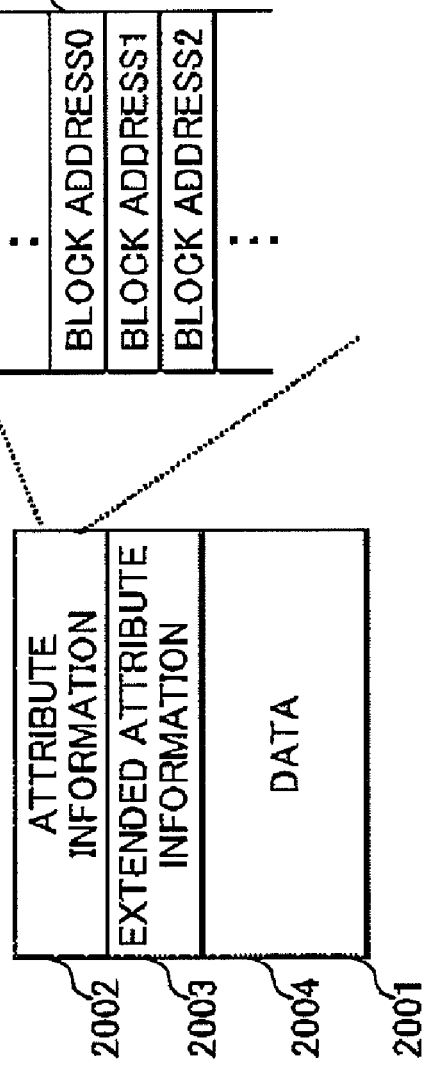

FIG.24

| BLOCK ADDRESS | USAGE STATUS FLAG |
|---|---|
| 0 | 1 |
| ⋮ | ⋮ |
| t | 1 |
| ⋮ | ⋮ |
| m−1 | 0 |

FIG.26

| BLOCK ADDRESS | fs1-snap0 | | fs1-snap1 | | ... | fs1-snap(n-1) | |
|---|---|---|---|---|---|---|---|
| | VOLUME | BLOCK | VOLUME | BLOCK | | VOLUME | BLOCK |
| 0 | 1 | 67 | 0 | 0 | ... | NONE | NONE |
| ⋮ | ⋮ | ⋮ | ⋮ | ⋮ | ... | ⋮ | ⋮ |
| v | 0 | 0 | 0 | 0 | ... | NONE | NONE |
| ⋮ | ⋮ | ⋮ | ⋮ | ⋮ | ... | ⋮ | ⋮ |
| k-1 | 1 | 217 | 0 | 0 | ... | NONE | NONE |
| k | 1 | 324 | 1 | 18 | ... | NONE | NONE |
| ⋮ | ⋮ | ⋮ | ⋮ | ⋮ | ... | ⋮ | ⋮ |
| j-1 | 0 | 0 | 0 | 0 | ... | NONE | NONE |

STORAGE SYSTEM

CROSS-REFERENCES TO RELATED APPLICATIONS

This application relates to and claims priority from Japanese Patent Application No. 2008-058793, filed on Mar. 7, 2008, the entire disclosure of which is incorporated herein by reference.

BACKGROUND

1. Field of the Invention

The invention relates generally to a storage system and more specifically to a technique for migrating file-level data between servers in a global name space in which a plurality of file servers cooperate with each other and provide one name space.

2. Description of Related Art

A global name space (hereinafter abbreviated to "GNS") is a technique for integrating share directories made public by a plurality of file servers and constructing a pseudo-single file system. In the GNS, file-level data is migrated for the purpose of hierarchical storage management, etc., for leveling access loads and used capacities so that they are not concentrated on a certain server or storing data accessed with high frequency in a high-speed, expensive, small-capacity storage apparatus and storing data accessed with low frequency in a low-speed, inexpensive, large-capacity storage apparatus.

Of methods for migrating data between file servers, a method using an apparatus (hereinafter referred to as an intermediate server) that relays communication between a client and a file server has been known (for example, see reference 1: US2004/0267830 "TRANSPARENT FILE MIGRATION USING NAMESPACE REPLICATION").

When receiving a file access request for a certain object (file) from a certain client, the intermediate server transfers the file access request to a file server having the relevant object after converting the request to a format that can be interpreted by that file server.

The intermediate server provides a GNS, and when migrating data between the file servers, hides from the client the fact that the data has been migrated, so that the client can access the migrated file using the same name space used before the migration.

On the other hand, the file server employs a technique called snapshot that captures an image for a file system at a certain time for use in backup or recovery for a file or the file system (for example, see reference 2: US2004-0186900 "METHOD OF MAINTAINING A PLURALITY OF SNAPSHOTS, SERVER APPARATUS AND STORAGE APPARATUS" and reference 3: US2006/0174075 "METHOD FOR CREATING AND PRESERVING SNAPSHOTS IN A STORAGE SYSTEM"). By capturing a snapshot periodically and mounting it to a certain point of the file system, even if a failure occurs in a file or a file system, the file or file system can be recovered relatively easily by referring to the snapshot that was captured during normal operation.

A snapshot is in general a differential snapshot that holds only differential data for an updated data block, instead of a copy of the data itself, and the differential snapshot makes an image for a virtual file system from the differential data and original data using a block copy management table, a block usage management table, etc.

The block copy management table and the block usage management table for providing the snapshot are managed only in the server providing the relevant snapshot, so file-level data is exchanged while the concept of blocks is hidden from an external server or a client. In other words, there is no interface for exchanging data in block units. Accordingly, when file-level data is migrated in a GNS, the original data in the migration source is deleted and a snapshot for the original file cannot be referred to any longer.

Even if both the original data and the block data in the snapshot are migrated in one way or another, they are not always placed in the same address they had before the migration, so the snapshot cannot be reconstructed simply by copying the block management table, etc.

SUMMARY

It is an object of the present invention to provide a storage system capable of, even after file-level data is migrated between servers handling snapshots, continuously providing the snapshot to a client.

In order to achieve the above object, in this invention, during the process of data being exchanged between servers, when file-level data is migrated from a migration-source server to a migration-destination server based on a request from a client, a server that responds to the request from the client reconstructs data in a snapshot volume based on the file data stored in a first volume and file-related data stored in a second volume and transfers response information containing the reconstructed data in the snapshot volume to the client.

With this invention, even after file-level data is migrated between servers handling a snapshots, the snapshot can be continuously provided to the client.

Other aspects and advantages of the invention will be apparent from the following description and the appended claims.

BRIEF DESCRIPTION OF THE DRAWINGS

FIG. 6 is a diagram showing an example of a block copy management table according to an embodiment in this invention.

FIG. 9 is a diagram showing an example of a share information management table according to an embodiment in this invention.

FIG. 10 is a diagram showing an example of a server information management table according to an embodiment in this invention.

FIG. 11 is a diagram showing an example of a GNS management table according to an embodiment in this invention.

FIG. 12 is a diagram showing an object ID management table according to an embodiment in this invention.

FIG. 13 is a diagram showing an example of an object ID according to an embodiment in this invention.

FIG. 14 is a diagram showing an example of a block copy management table in a destination server before data migration according to an embodiment in this invention.

FIG. 15 is a diagram showing an example of the block copy management table in the destination server after the data migration according to an embodiment in this invention.

FIGS. 20A and 20B are diagrams respectively showing configuration examples of i node information before migration and that after migration in embodiment 3 in this invention.

FIG. 24 is a diagram showing an example of a block usage management table according to an above embodiment of this invention.

FIG. 26 is a diagram showing an example of a block copy management table in the destination server after data migration according to an embodiment in this invention.

DETAILED DESCRIPTION OF PREFERRED EMBODIMENTS

An example of an embodiment in this invention will be described below with reference to the attached drawings.

Embodiment 1 in this invention will be described with reference to FIGS. 1 to 18, 24 and 26 to 30. In embodiment 1, a server in this invention operates as an end server that provides a snapshot and migrates file-level data and differential data for this file, and an intermediate server holds an object ID management table and directs accesses for migration-source objects to migration destinations.

Figure 1:
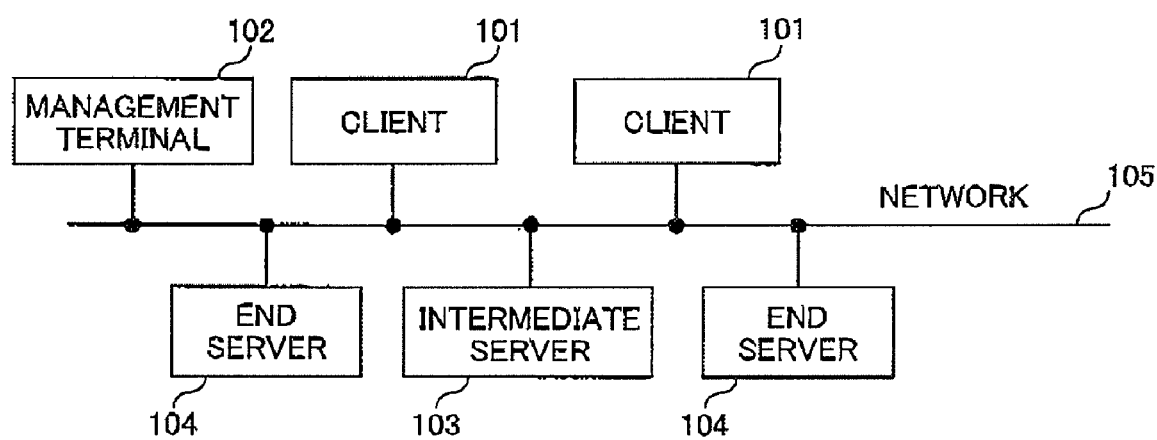
FIG. 1 is a diagram showing a configuration example of a computer system including servers according to an embodiment in this invention.

Processing sequences in embodiment 1 will be described after the descriptions of the drawing. FIG. 1 is a diagram showing a configuration example of a storage system using a server according to this invention. In this storage system, at least one client 101, at least one management terminal 102, at least one intermediate server 103 and at least one end server 104 are connected to a network 105 (e.g., a LAN (Local Area Network)). Here, the intermediate server 103 and the end server 104 may be realized as a single server providing both of their functions.

The client 101 is an apparatus that uses a file service provided by the intermediate server 103 or the end server 104. The management terminal 102 is an apparatus with which an administrator for the storage system manages various operations, e.g., migrating data between the end servers 104 and commanding retrieval for snapshots.

The intermediate server 103 is arranged between the client 101 and the end server 104 in order to relay a request from the client 101 to the end server 104 and a response from the end server 104 to the client 101. The request from the client 101 to the intermediate server 103 or the end server 104 is a message signal for requesting certain processing (e.g., retrieval for an object such as a file and a directory), while the response from the intermediate server 103 or the end server 104 to the client 101 is a message signal for responding to the request.

The intermediate server 103 may be logically located between the client 101 and the end server 104 so that it can relay the communication between them. Although the client 101, the intermediate server 103 and the end server 104 are connected to the common network 105, the intermediate server 103 is logically located between each client 101 and each end server 104 to relay the communication between the relevant client 101 and the relevant end server 104.

The intermediate server 103 also has a file server function for providing a file service to the client 101, in addition to the relay function for relaying requests and responses. When providing the file service, the intermediate server 103 constructs a virtualized name space and provides the virtual name space to the client 101. The virtual name space is a single pseudo file system provided by integrating all or a part of sharable file systems in the plurality of intermediate servers 103 and end servers 104.

Specifically, for example, if a part (X) of a file system (directory tree) managed by a certain server 103 or 104 and a part (Y) of a file system (directory tree) managed by another server 103 or 104 are sharable, the intermediate server 103 can construct a single pseudo file system (directory tree) containing the X and Y parts and provide it to the client 101. In this situation, the single pseudo file system (directory tree) containing the X and Y parts is a virtualized name space and generally referred to as a "GNS (Global Name Space)."

On the other hand, a file system managed by each intermediate server 103 or end server 104 is sometimes referred to as a "local file system." In the below description, all or a part of the local file system, which is a sharable part (X and Y parts in the above example)—namely a logical public unit in a local file system—will be sometimes referred to as "share unit."

In this embodiment, a share ID, which is an identifier for identifying each share unit, is assigned to each share unit, and the intermediate server 103 can transfer a file access request from the client 101 using the share ID. The share unit contains one or more objects (e.g., directory and file). The end server 104 is a server in this invention for providing the client 101 with a file service such as creating, deleting, reading, writing and migrating a file and providing snapshots.

Figure 2:
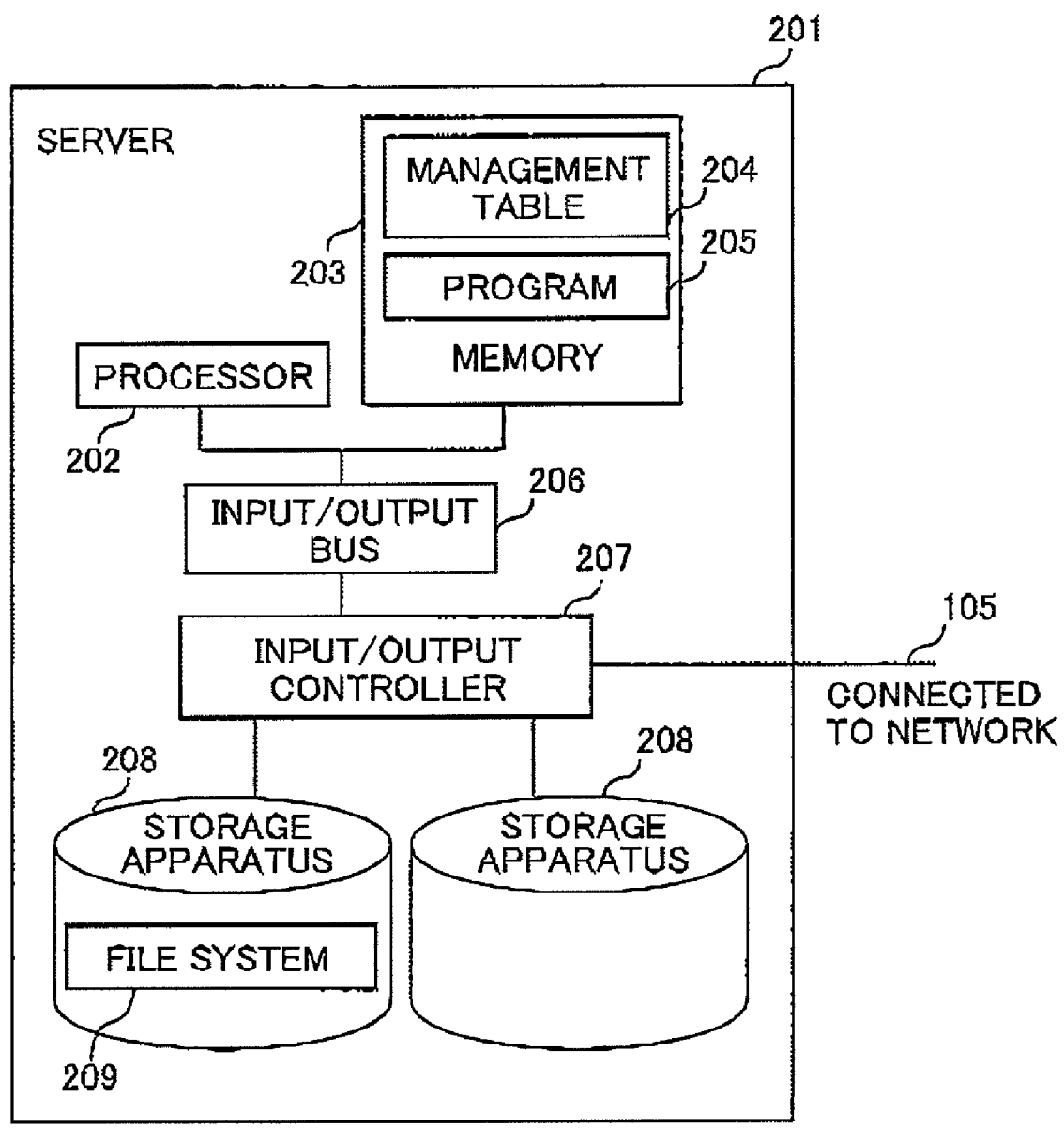
FIG. 2 is a diagram showing a configuration example of a server according to an embodiment in this invention.

FIG. 2 is a block diagram showing a configuration example of a server 201 (intermediate server 103 or end server 104).

The server 201 includes at least one processor (e.g., CPU), a memory 203, an input/output bus 206 for the memory 203, a storage apparatus 208, and an input/output controller for controlling input/output for the memory 203, the storage apparatus 208 and the network 105. The memory 203 stores a program 205 executed by the processor 202 and various management tables 204. The program 205 and the management tables 204 will be described later in detail.

The storage apparatus 208 may either be a logical apparatus (logical volume) formed by a storage space(s) in one or more physical storage apparatuses (e.g., hard disk and flash memory) or a physical storage apparatus. In other words, the storage apparatus 208 may be a logical volume provided by a storage apparatus connected via an external network (e.g., SAN (Storage Area Network)). The storage apparatus 208 stores a file system 209 for managing data such as a file and differential data for a snapshot.

Figure 3:
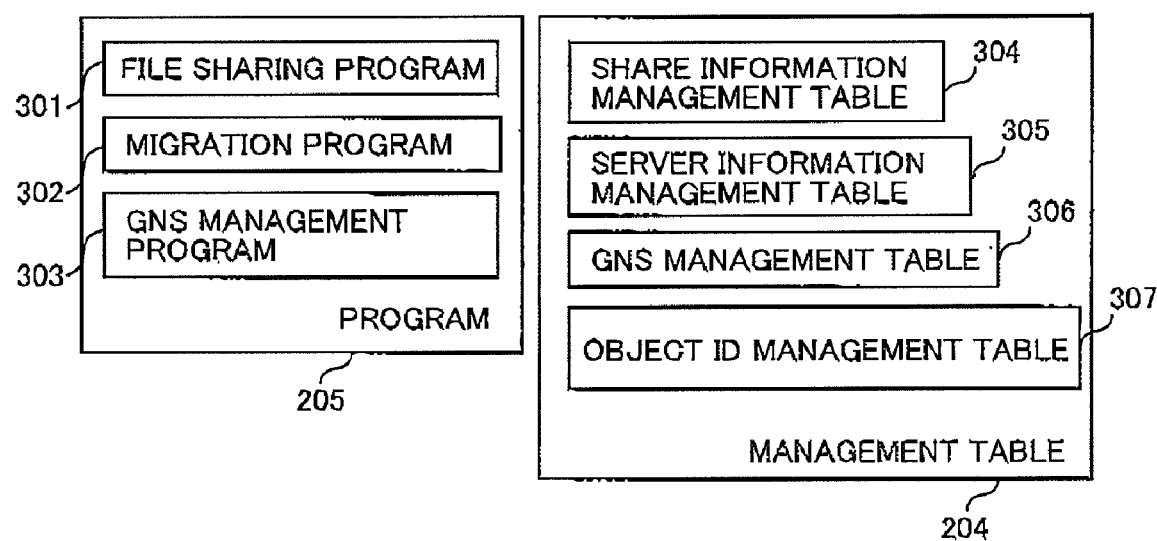
FIG. 3 is a diagram showing configuration examples of a program and a management table in an intermediate server according to an embodiment in this invention.

FIG. 3 is a diagram showing the program 205 and the management table 204 stored in the memory 203 in the intermediate server 103. The program 205 in the intermediate server 103 includes a file sharing program 301, a migration program 302 and a GNS management program 303. The file sharing program 301 performs processing for exchanging data between the client 101 and the end server 104.

More specifically, the file sharing program 201 receives from the client 101 a file data processing request for the end server 104, and transmits the received request to the relevant end server 104. Then the file sharing program 301 receives a response from the end server 104 and transmits the response to the client 101. The migration program 302 manages the object ID management table 307. Specifically, when data is migrated, the migration program 302 receives an object ID before migration and an object ID after migration from the end server 104 and records them in the object ID management table 307. The GNS management program 303 resolves a GNS path name. Specifically, in response to a GNS path resolution request that the file sharing program 301 received from the client 101, the GNS management program 303 refers to the GNS management table 306, selects a suitable end server 104 and a local path for this end server 104, and provides the selected end server 104 and its local path to the client 101 via the file sharing program 301.

The management table 204 in the intermediate server 103 includes a share information management table 304, a server information management table 305, the GNS management table 306 and the object ID management table 307. The share information management table 304 is a table for managing information about sharing, and its detailed description will be given later. The server information management table 305 is a table for managing information about servers, and its detailed description will be given later. The GNS management table 306 is a table for managing information about a GNS, and its detailed description will be given later. The object ID management table 307 is a table for managing information about the correspondence between object IDs, and its detailed description will be given later.

Figure 4:
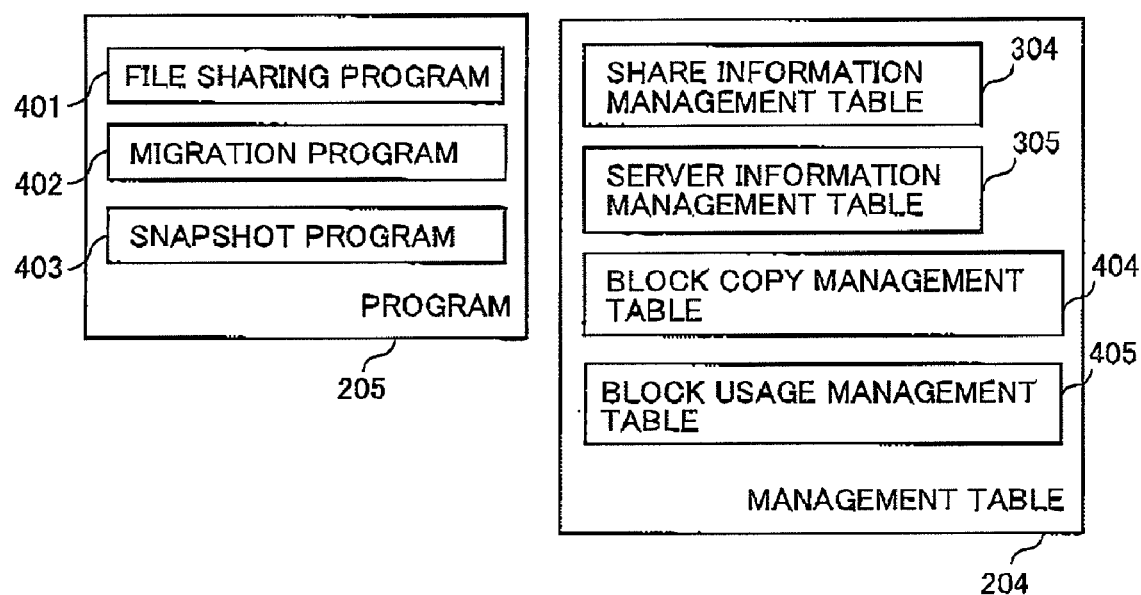
FIG. 4 is a diagram showing configuration examples of a program and a management table in an end server according to an embodiment in this invention.

FIG. 4 is a diagram showing the program 205 and the management table 204 stored in the memory 203 in the end server 104. The program 205 in the end server 104 includes a file sharing program 401, a migration program 402 and a snapshot program 403.

The file sharing program 401 processes a request for data from the intermediate server 103. Specifically, the file sharing program 401 receives a file data processing request from the intermediate server 103 and processes a request for the specified data and then transmits the processing result to the intermediate server 103. The migration program 402 performs transmission processing for the specified data. Specifically, the migration program 402 performs, based on information about a file and a destination server specified by the management terminal 102, migration processing for the relevant file data and differential data in the snapshot for the relevant file. When the migration program 402 in the destination end server 104 receives the migrated data, the end server 104 sequentially or continuously stores the received data, and then creates object IDs for the migrated file data and snapshot and transmits the created object IDs to the intermediate server 103.

The snapshot program 403 performs processing concerning snapshots. Specifically, the snapshot program 403 retrieves and deletes a snapshot, saves the differential data when a change is made to original file data and creates a snapshot file from the original file data and the differential data.

The management table 204 in the end server 104 includes the share information management table 304, the server information management table 305, a block copy management table 404 and a block usage management table 405. The block copy management table 404 is a table for managing information about a differential block in a snapshot, and it will be described later in detail. The block usage management table 405 is a table for managing information about block usage in a differential volume for the snapshot, and it will be described later in detail.

Figure 5:
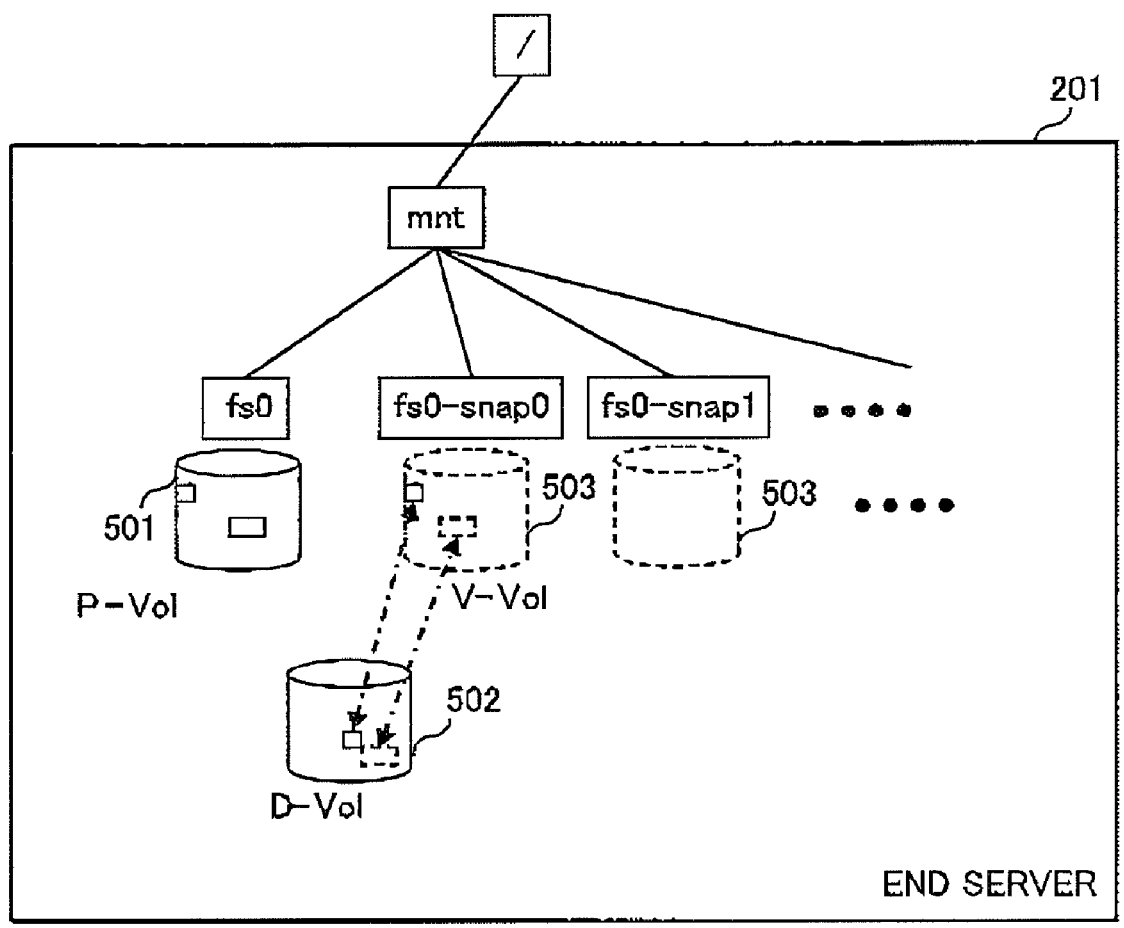
FIG. 5 is a diagram showing a configuration example of a snapshot according to an embodiment in this invention.

FIG. 5 is a diagram showing a configuration example of a snapshot. In the end server 201, a volume (V-Vol) 503, in which an image at a certain time for a certain file system ("fs0" in the example in FIG. 5) stored in a volume (P-Vol) 501 is virtually constructed, is a snapshot. In the snapshot, differential data is actually stored in a differential volume (D-Vol) 502, so data in the P-Vol and the data in the D-Vol are used to reconstruct the data in the V-Vol.

FIG. 6 is a diagram showing an example of the block copy management table 404. The block copy management table 404 is stored in the differential volume 502, read in the memory 203 when used. If a change is made in the memory 203, the block copy management table 404 is written back to the differential volume 502.

The block copy management table 404 is a table having entries each consisting of a group of a block address 601 and one or more snapshot names 602. The entry of the snapshot name 602 consists of a pair of a volume flag 603 and a block address 604. The block address 601 shows a block address for a file system volume. The snapshot name 602 is a name for identifying each snapshot.

The volume flag 603 shows whether a data block corresponding to the block address 601 containing the relevant snapshot is in the file system volume (flag="0") or in the differential volume (flag="1"). The block address 604 shows a block address in which a data block corresponding to the block address 601 for the relevant snapshot is to be stored. When the volume flag 603 corresponding to the block address 601 is "0." the block address 604 shows the data block of the block address 601 in the file system volume 501, while when the volume flag 603 is "1," the block address 604 shows a block address in the differential volume 502.

For example, in FIG. 6, the volume flag 603 is "1" and the block address 604 is "108" in the entry with the snapshot name 602 being "fs0-snap0," so the data with the block address 601 being "t" in the "fs0-snap0" snapshot (V-Vol) is stored in a block with the block address 604 being "108" in the differential volume (D-Vol). Accordingly, when receiving a request for referring to the data block with the block address 601 being "t" in the "fs0-snap0" snapshot, the end server 104 provides as a response the data with its block address 604 being "108" in the differential volume.

Figure 24:
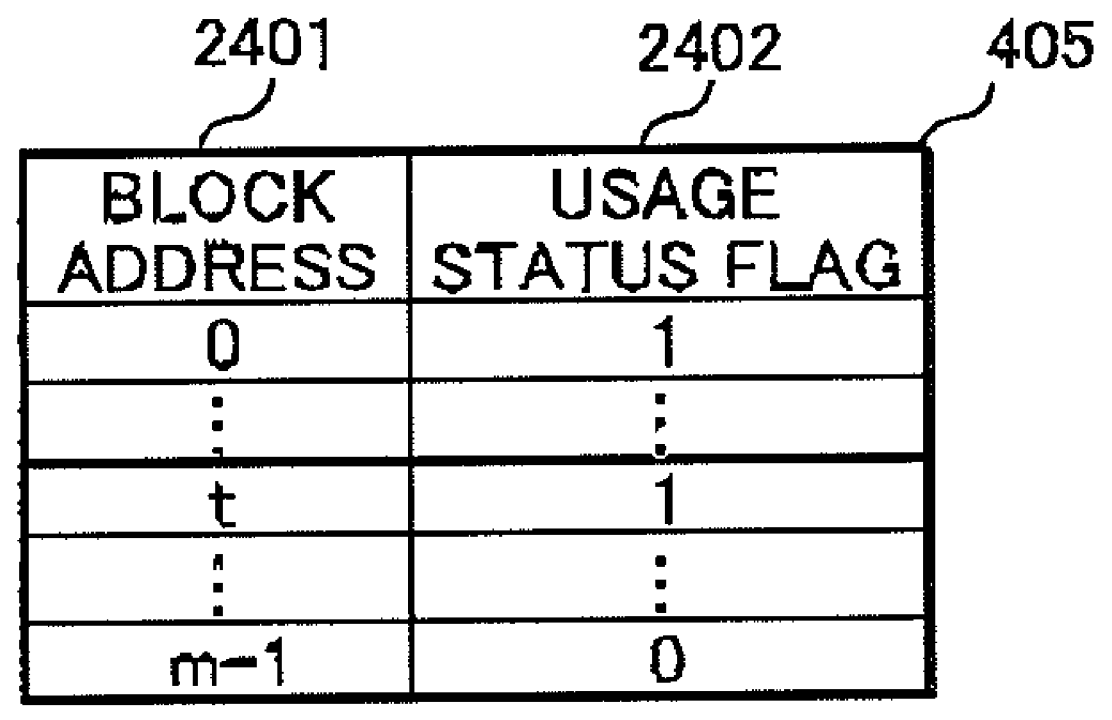

FIG. 24 is a diagram showing an example of the block usage management table 405. The block usage management table 405 is stored in the differential volume 502 and read in the memory 203 when used. When a change is made in the memory 203, the block usage management table 405 is written back to the differential volume 502.

The block usage management table 405 is a table having entries each consisting of a pair of a block address 2401 and a usage status flag 2402. The block address 2401 shows a block address in the differential volume. The usage status flag 2402 shows whether the differential data is stored in the block address 2401 in the differential volume (flag="1") or not (flag="0"). If a change has been made to the data in the file system (P-Vol) after acquiring its snapshot, differential data resulting from that change is stored in the differential volume. At this time, the block usage management table 405 is referred to, a block with the usage status flag 2402 being "0" (i.e., an unused block) is selected and the differential data is stored in this block. Then the usage status 2402 for the entry corresponding to this block address 2401 is changed to "1."

Figure 7:
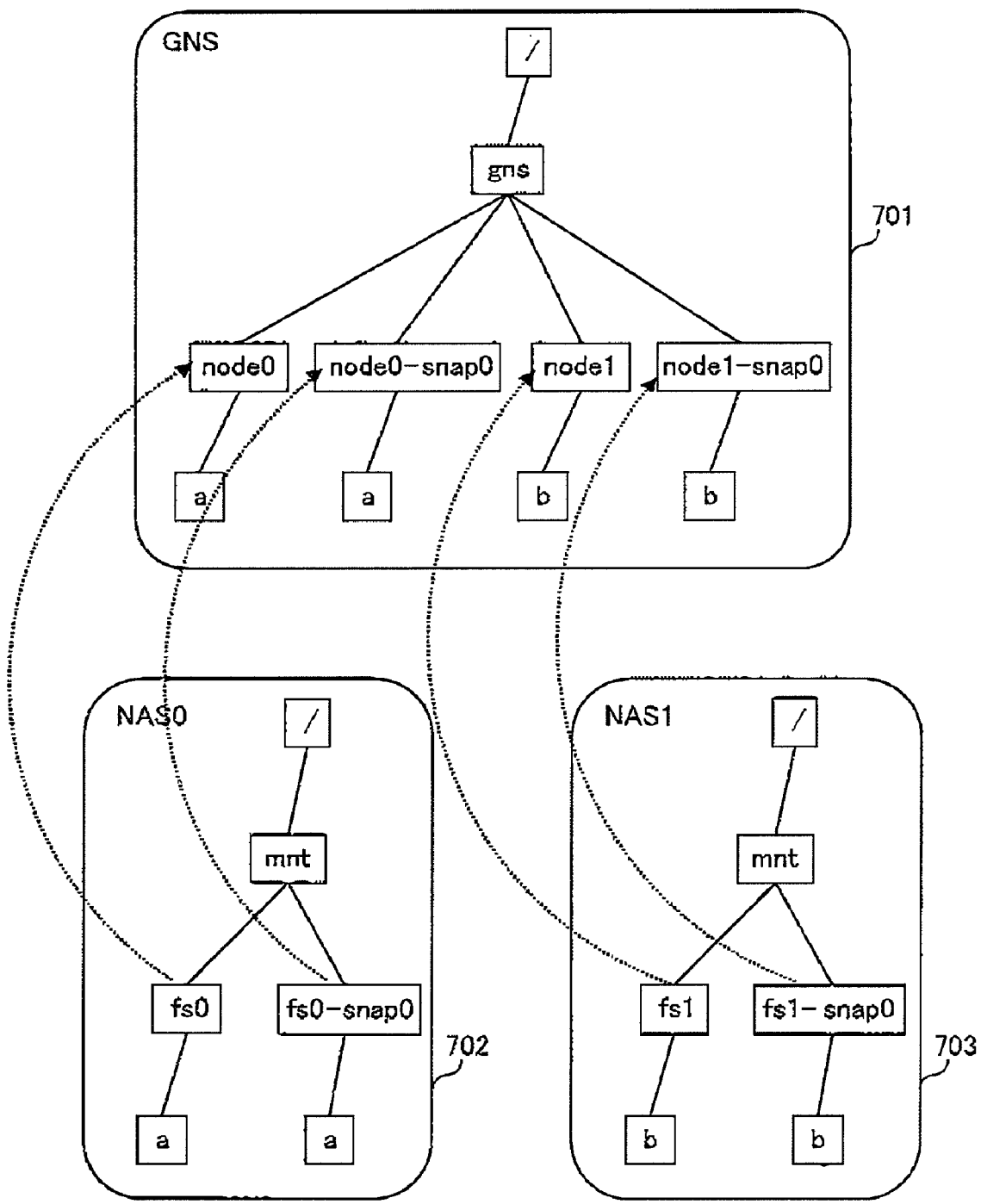
FIG. 7 is a diagram showing a configuration example of a GNS according to an embodiment in this invention.

FIG. 7 is a diagram showing a configuration example of the GNS. In the example in FIG. 7, local file systems (702 and 703) managed by two end servers 104 (end server "NAS0" and "NAS1") are integrated to construct a single file system GNS 701. The "/mnt/fs0" and its following part and the "/mnt/fs0-snap0" and its following part in the NAS0 serve as share units, and they are respectively connected to "/gns/node0" and "/gns/node0-snap0" in the GNS 701. Likewise, "/mnt/fs1" and its following part and "/mnt/fs1-snap0" and its following part in the "NAS1" serve as share units, and they are respectively connected to "/gns/node1" and "/gns/node1-snap0" in the GNS 701

Figure 8A:
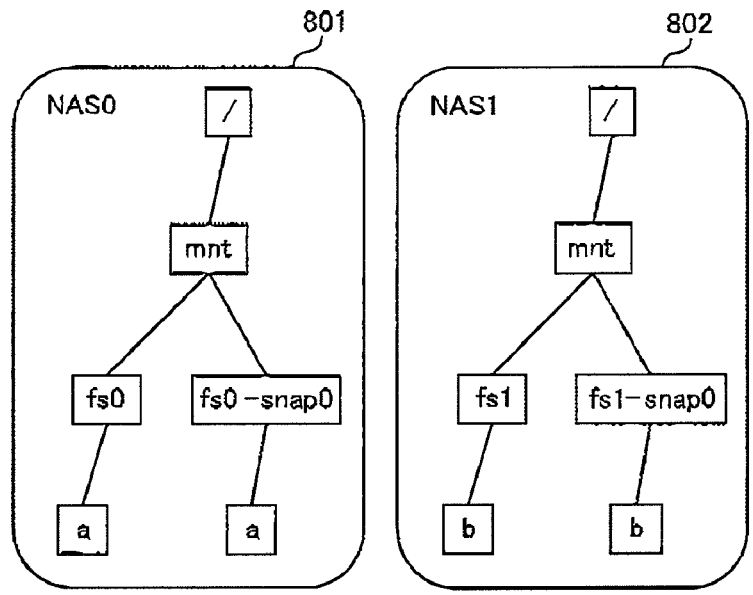
FIGS. 8A and 8B are diagrams respectively showing configuration examples of file data before migration and after migration in embodiment 1 in this invention.
Figure 8B:
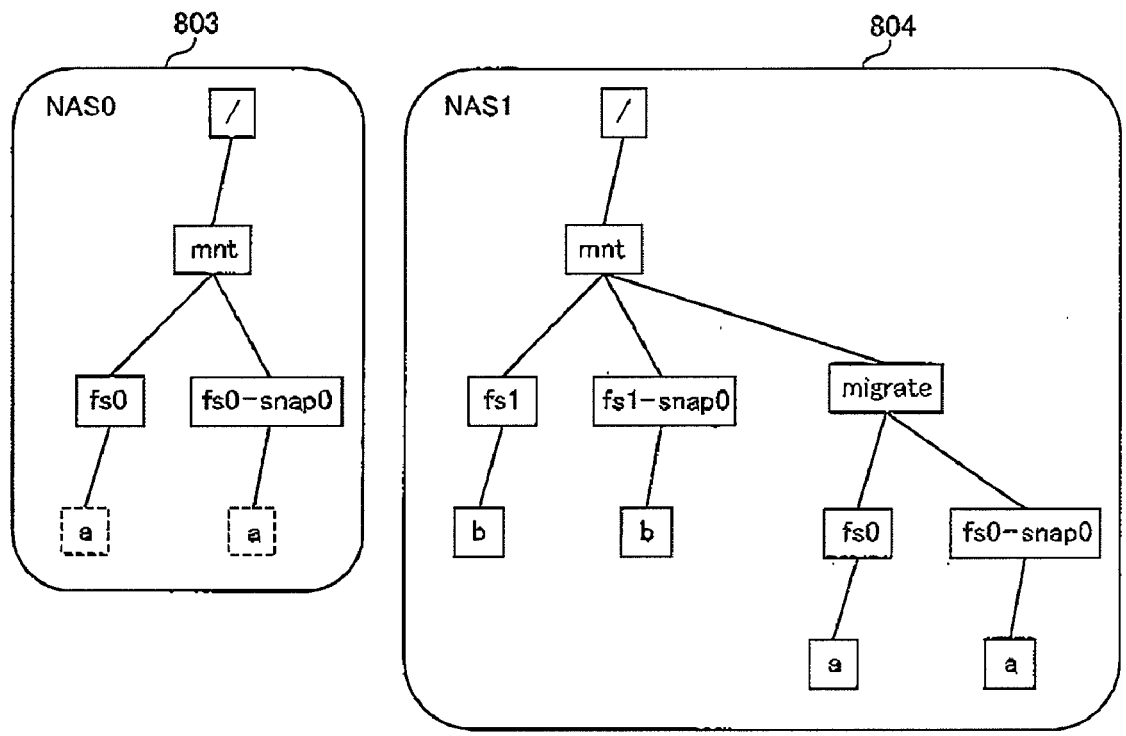

FIGS. 8A and 8B are diagrams showing examples of a local file system tree before and after migrating file data. FIG. 5A shows the local file system trees (801 and 802) in "NAS0" and in "NAS1" before the migration of the file data. FIG. 8B shows local file system trees (803 and 804) in "NAS0" and in "NAS1" after the migration of the file data.

In the example shown in FIGS. 8A and 8B, the file indicated by "/mnt/fs0/a" managed by "NAS0" is migrated as "/mnt/migrate/fs0/a" managed by "NAS1." The snapshot of this file, which is indicated by "/mnt/fs0-snap0/a," is also migrated as "/mnt/migrate/fs0-snap0/a" managed by "NAS1."

FIG. 9 is a diagram showing an example of the share information management table 304. The share information management table 304 is a table having entries each including a group consisting of a share ID 901, a server ID 902 and a share name 903. The share ID 901 is an ID for identifying each share unit. The server ID 902 is an ID for identifying each server. The share name is a name that is set for an administrator to easily manage the share unit.

FIG. 10 is a diagram showing an example of the server information management table 305. The server information management table 305 is a table having entries each including a group consisting of the server ID 902, a server name 1001 and an IP address 1002. The server name 1001 is a name that is set for the administrator to easily manage the server. The IP address 1002 is an IP address needed for connecting to the relevant server.

Although the share information management table 304 and the server information management table 305 are two separate management tables in the examples shown in FIGS. 9 and 10, the tables may also be integrated into a single management table by adding the server names 1001 and the IP addresses 1002 in the server information management table 305 to corresponding entries based on the server IDs 902 in the share information management table 304.

FIG. 11 is a diagram showing an example of a GNS management table 306. In FIG. 11, the GNS management table has entries each including a group consisting of the share ID 901, a GNS path name 1101, a server ID 902 and a share path name 1102. The GNS path name 1101 shows a path in the GNS 701 in FIG. 7. The share path name 1102 shows a path in the local file system (702 or 703) in FIG. 7.

For example, the share unit with the share ID 901 "0" is the share unit with the share path name 1102 "/mnt/fs0" in the local file system managed by the server identified by the server ID 902 "0," and is connected to the GNS path name 1101 "/gns/node0."

FIG. 12 is a diagram showing an example of the object ID management table 307. The object ID management table 307 has entries each including a pair consisting of a migration-source object ID (OID) 1201 and a migration-destination object ID (OID) 1202. The migration-source object ID (OID) 1201 is an object ID for identifying a file managed by the source end server 104. The migration-destination object ID (OID) 1202 is an object ID for identifying a file managed by the destination end server 104.

When accessing a certain file, the client 101 resolves the GNS path name (described above) to acquire the object ID for identifying the file concerned. An object ID is created by the end server 104 and is unique to each file and directory. The object ID may be created in any format as long as it is unique in the relevant server. It is generally created using an i node number or similar, which is a unique ID used for managing a file system in the server. In the following processing, the client 101 holds this object ID and uses the object ID in order to access the certain file.

FIG. 13 is a diagram showing a configuration example of an object ID 1301. The object ID 1301 is formed from, for example, the share ID 901 and a local object ID 1302. The local object ID 1302 is an ID for identifying a file created by each end server 104.

FIG. 14 is a diagram showing an example of the block copy management table 404 in the migration-destination server before file data migration according to the embodiment in this invention. A more detailed description will be given later.

FIG. 15 is a diagram showing an example of the block copy management table 404 in the migration-destination server after the file data migration according to the embodiment in this invention. A more detailed description will be given later.

A processing sequence followed by the intermediate server 103 will be described below. In the storage system in this embodiment, data in the file system managed by the end server 104 is provided to the client via the intermediate server 103 providing the GNS. As described earlier, the intermediate server 103 and the end server 104 may operate as a single server. In that case, this single server holds the programs and the management tables stored in both the intermediate server 103 and the end server 104.

Figure 16:
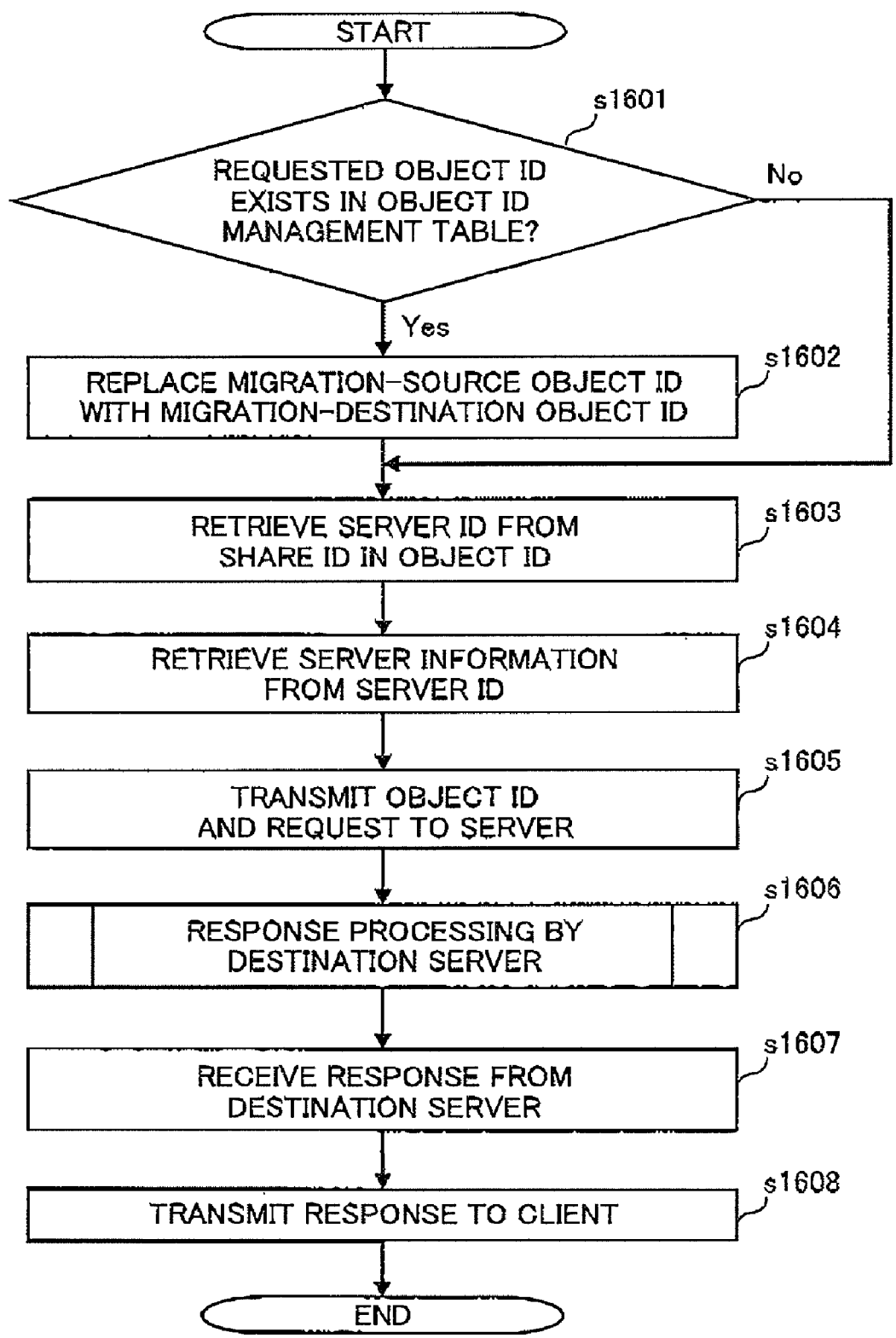
FIG. 16 is an example of a flowchart showing how an intermediate server processes a request from a client in embodiments 1 and 2 in this invention.

FIG. 16 is a flowchart showing an example of how the intermediate server 103 processes a request from the client 101 according to this embodiment. This processing is performed by the file sharing program 301 in the intermediate server 103.

First, when receiving a request containing an object ID from the client 101 the processor 202 in the intermediate server 103 checks if the requested object ID exists as the migration-source object ID 1201 in the object ID management table 307 (s1601). If it exists in the object ID management table 307 (s1601; Yes), the processor 202 replaces the object ID requested by the client 101 with the migration-destination object ID 1202 corresponding to the relevant migration-source object ID 1201 (s1602).

If the requested object ID does not exist in the object ID management table 307 (s1602: No) the processor 202 proceeds to the below processing.

Next, the processor 202 retrieves, based on the share ID 901 contained in the relevant object ID, the server ID 902 corresponding to this share ID 901 using the share information management table 304 (s1603). The processor 202 also retrieves, based on the retrieved server ID 902, server information such as the server name 1001 and the IP address 1002 corresponding to this server ID 902 using the server information management table 305 (s1604). Then the processor 202 transmits the request from the client 101 and the object ID to a suitable server based on the retrieved server information (s1605).

Then response processing (described later in detail) is performed in the destination server (s1606). When receiving a response from the destination server (s1607), the processor 202 transmits the received result and the object ID to the client 101 as a response (s1608) and terminates the processing.

Figure 17:
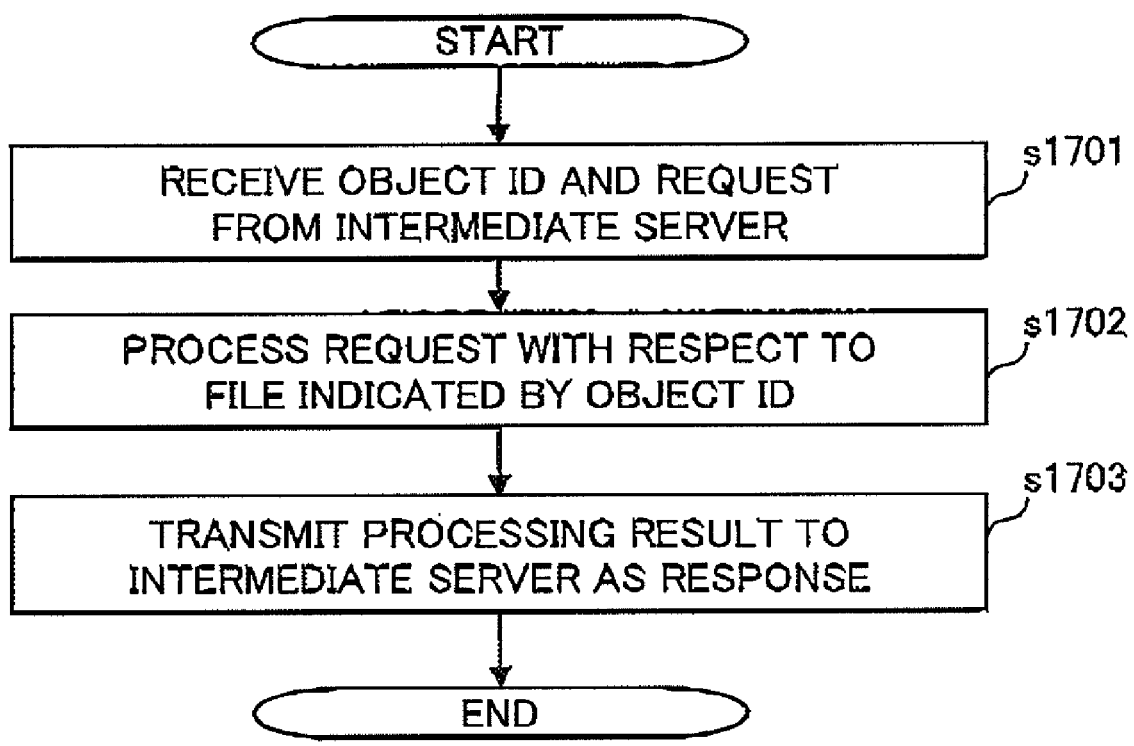
FIG. 17 is an example of a flowchart showing response processing by a destination server in embodiments 1 and 2 in this invention.

FIG. 17 is a flowchart showing an example of processing in step s1606 in FIG. 16, i.e., the response processing performed by the destination server. The processor 202 in the end server 104 starts the file sharing program 401 to perform this processing.

When receiving the object ID and the request from the intermediate server 103 (s1701), the end server 104 serving as the destination server identifies a processing-target file based on the received object ID, and processes this file in accordance with the request (s1702). At this time, if the request for the file requests processing for making a change in the data (e.g., writing), the processor 202 locks the relevant file so it cannot be accessed and written to by other servers, then provides the processing result and the object ID to the intermediate server 103 as a response (s1703), and terminates the processing.

Figure 18:
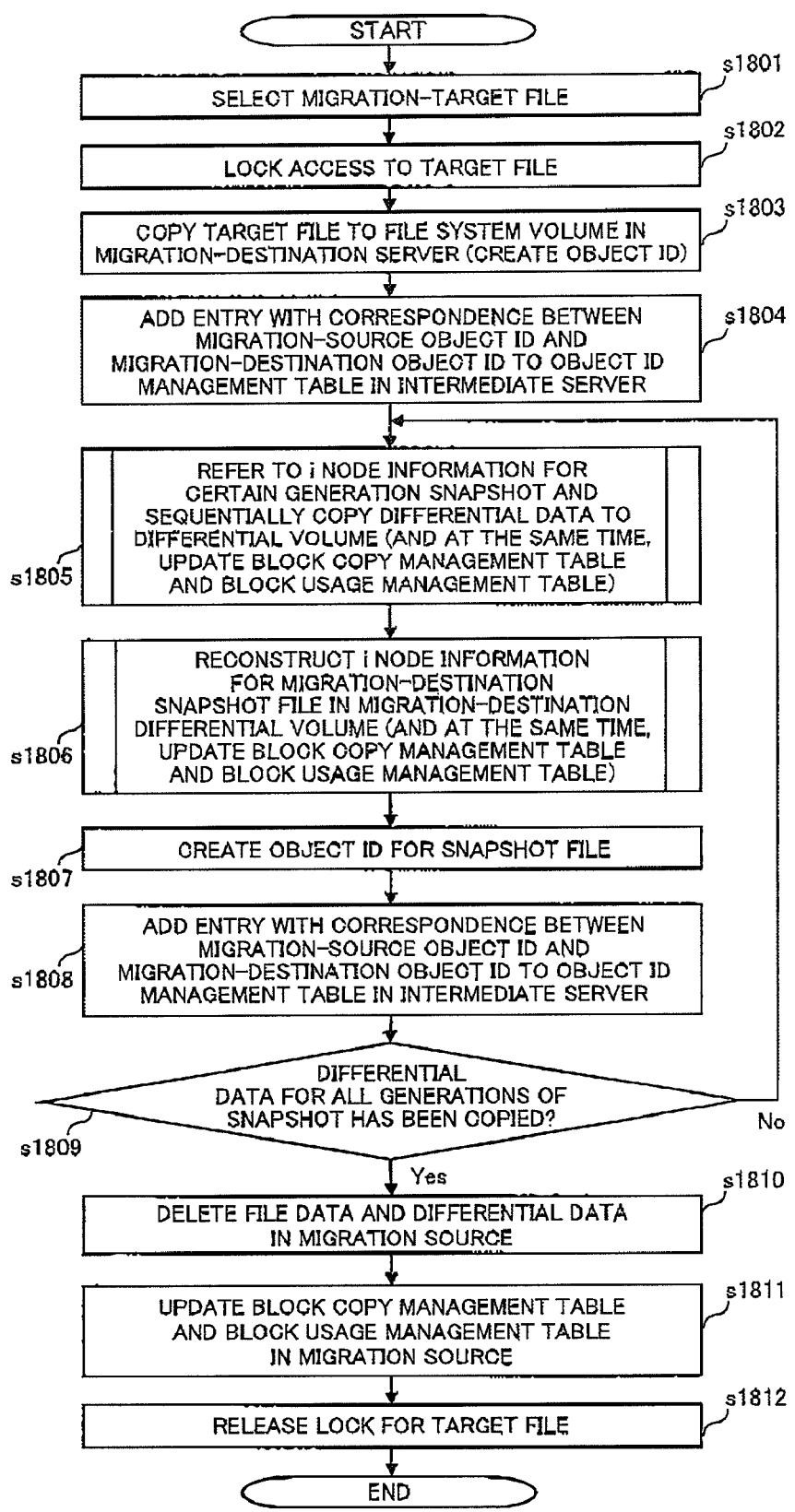
FIG. 18 is a flowchart showing an example of data migration processing in embodiment 1 in this invention.

Next, a processing sequence for data migration by the end server 104 will be described. FIG. 18 is a flowchart showing an example of file data migration processing in this embodiment.

First, the administrator selects a migration-target file on, for example, a screen in the management terminal 102 and commands the migration program 402 in the end server 104 managing the target file to migrate the target file to the migration-destination end server 104 (s1801). The processor 202 in the end server 104 receiving this commands, using the migration program 402, the file sharing program 401 to lock access to the target file. The file sharing program 401 receiving this command locks the access to the target file (s1802). At this time, the migration program 402 may command the file sharing program 301 in the intermediate server 103 to lock the access to the target file.

Next, the migration program 402 commands the migration program 402 in the migration-destination end server 104 to copy the migration-target file data (s1803). At this time, the processor 202 creates an object ID for the copied file in the migration-destination end server 104.

Next, the migration program 402 in the migration-source end server 104 transmits the object ID for the migration-target file to the migration program 302 in the intermediate server 103, while the migration program 402 in the migration-destination end server 104 transmits the object ID created in s1803 to the migration program 302 in the intermediate server 103. The migration program 302 in the intermediate server 103 adds to the object ID management table 307 an entry containing the object IDs received from the migration-source and migration-destination end servers 104 respectively as the migration-source object ID 1201 and the migration-destination object ID 1202 (s1804).

Next, the processor 202 selects a snapshot at a certain generation, refers to i node information in the snapshot file at the certain generation for the migration-target file, copies to the migration-destination end server 104 the differential data block of the snapshot file, and updates the block copy management table 404 and the block usage management table 405 in the migration-destination end server 104 (s1805). A more detailed description will be given below with reference to FIG. 27.

Figure 27:
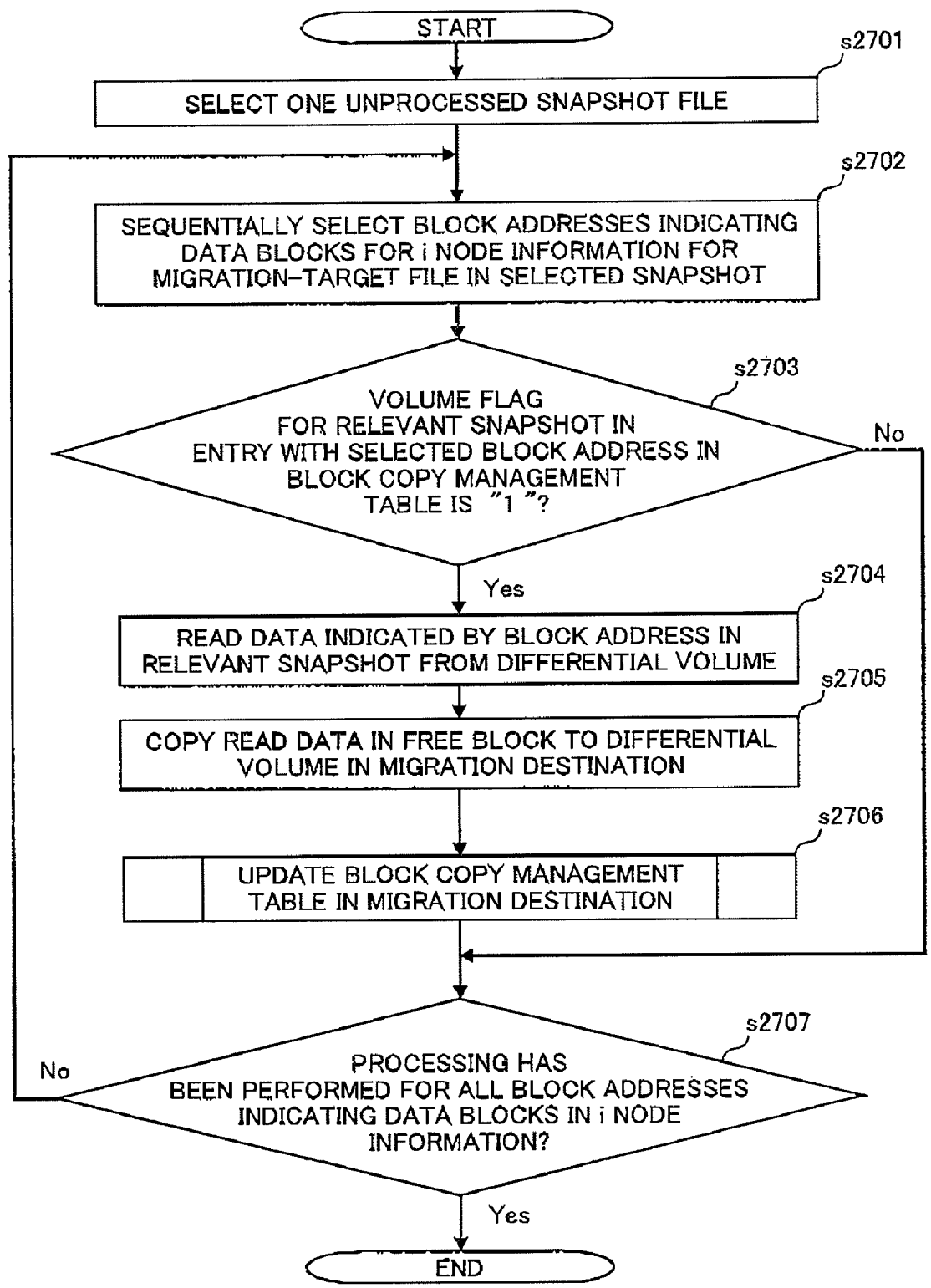
FIG. 27 is a diagram showing an example of a flowchart for copy processing for snapshot file data in embodiments 1 and 3 in this invention.

FIG. 27 is a flowchart showing an example of copy processing for snapshot file data. First, the processor 202 in the migration-source end server 104 selects one snapshot that has not been processed (s2701). For example, the processor 202 selects the snapshot with the snapshot name 602 "fs0-snap0" in the block copy management table 404.

Next, the processor 202 sequentially selects addresses in the block addresses 2005 (see FIG. 20) in the i node information for the migration-target file in the selected snapshot (s2702). Next, if the volume flag 603 for the snapshot in the entry with the selected block address 601 is "1" in the block copy management table 404 (s2703: Yes), the processor 202 reads the data, which is indicated by the block address 604, in the differential volume in the migration-source end server 104 in accordance with the migration program (s2704).

For example, if the selected block address is "t" in accordance with the migration program 402, the processor 202 checks the volume flag 603 for the snapshot with the snapshot name 602 "fs0-snap0" in the entry with the block address 601 of "t" in the block copy management table 404. Then if the volume flag 603 is "t" and the block address 604 is "108," the processor 202 reads data with its block address in the differential volume being "108."

Next, the processor 202 transmits the read differential volume data to the migration-destination end server 104. The processor 202 in the migration-destination end server 104 copies the received data to the differential volume in accordance with the migration program 402 (s2705). At this time, the processor 202 refers to the block usage management table 405 in the migration-estimation end server 104, selects a block that has not been used for storing data, i.e., a block address 2401 with the usage status flag 2402 of "0," stores the block data in the selected address, and sets the usage status flag 2402 to "1."

Then the processor 202 in the migration-destination end server 104 updates the block copy management table 1401 (s2706). A more detailed description will be given later with reference to FIG. 28.

After the block copy management table 1401 is updated or when the volume flag 603 is "0" in s2703—which indicates that the data in the relevant block is the data in the original file system and has already been copied in s1803—the processor 202 in the migration-destination end server 104 judges whether or not the processing has been performed for all the block addresses indicating the data blocks in the i node information (s2707). If the processing has been performed for all the block addresses 2005 in the i node information (s2707: Yes), the processor 202 terminates the processing in s1805. On the other hand, if the processing has not been performed for all the block addresses (s2707: No), the processor 202 returns to s2702 and repeats the processing.

Figure 28:
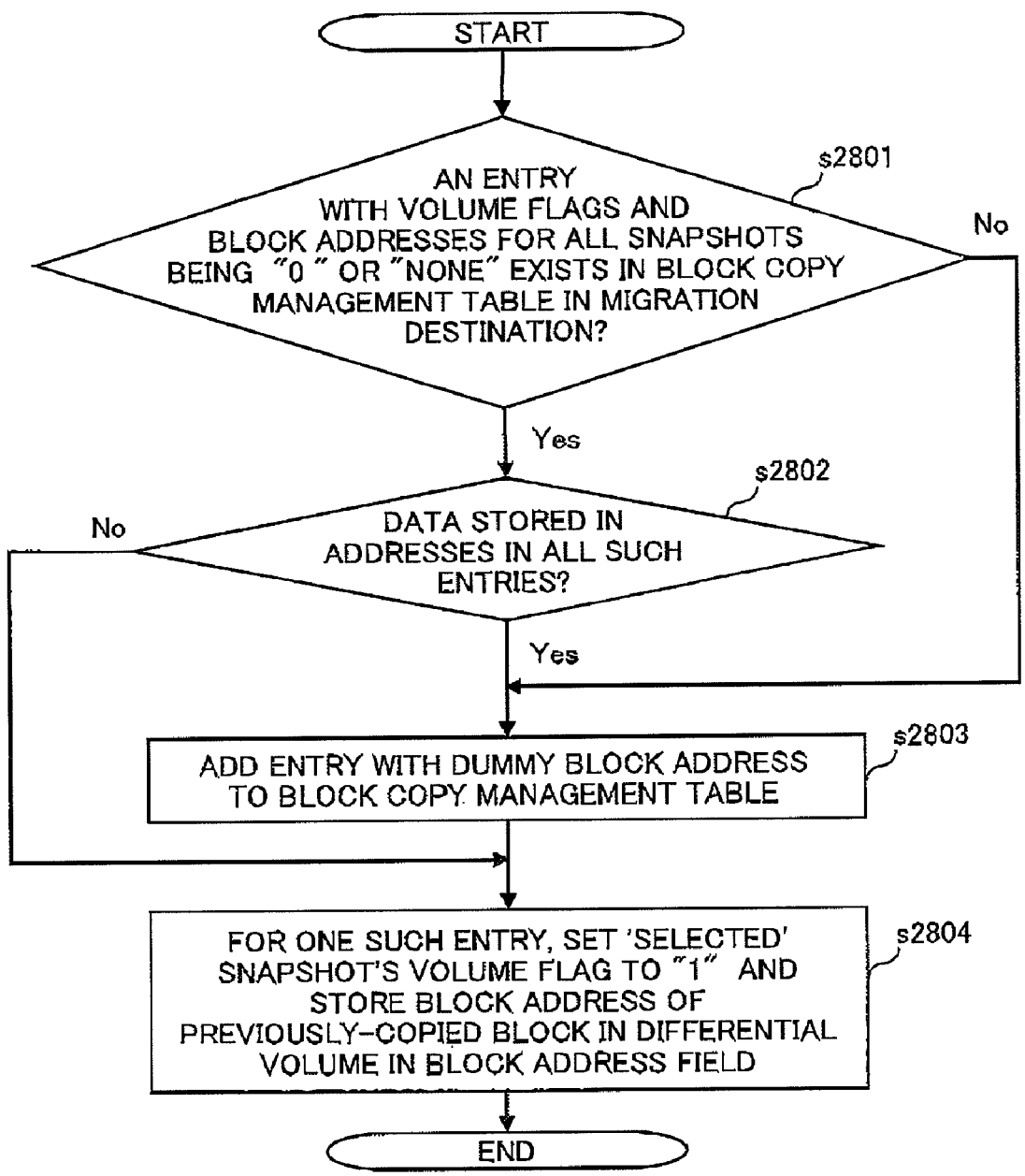
FIG. 28 is an example of a flowchart showing processing for updating a block copy management table in a migration destination in embodiments 1 and 3 in this invention.

FIG. 28 is a flowchart showing an example of the processing in s2706, i.e., update processing for the block copy management table in the migration destination. Here, which address block in the migration-destination end server 104 snapshot corresponding to the snapshot selected in the migration-source end server 104 the copied data block corresponds to is determined and the block copy management table is updated.

First, the processor 202 in the migration-destination end server 104 checks whether or not there is any entry whose volume flags 603 and block addresses 604 for all snapshots are "0" or "none" in block copy management table 1401 in the migration destination (s2801). If such an entry(s) exist(s) (s2801: Yes), the processor 202 checks whether or not data is stored in the block addresses 601 in all such entries and the file containing the relevant data blocks has not been deleted (s2802). If the data is stored in all such entries (s2802: Yes) or if no such entry exists in s2801 (s2801: No), the processor 202 adds an entry having a dummy block address 601 to the block management table 404 (s2803).

Next, the processor 202 selects one of the above entries, sets the volume flag 603 for the relevant snapshot to "1," and stores in the block address 604 the block address in which the data copied in s2705 is copied to the differential volume in the migration destination (s2804). For example, as shown in FIG. 14, the processor 202 refers to the block copy management table 1401 in the migration-destination end server 104, selects an entry with the volume flags 603 and the block addresses 604 for all the snapshots being "0" or "none" (e.g., selects the entry with its block address 601 being "v"), and sets the volume flag 603 to "1" and the block address 604 to the stored block address ("324" in the example in FIG. 15) in the differential volume for the snapshot with the snapshot name 602 "fs1-snap0" in the selected entry.

Or, the processor 206 adds an entry with a dummy block address 601 as shown in FIG. 26 and updates the block copy management table 404 as in the above processing.

If it is determined that there is any entry that has no stored data in s2802, the processor 202 proceeds to the processing in s2804. Alternatively, the processor 202 may start the processing from s2803 without performing the judgments in s2801 and s2802. The processing in s2706 ends with the above operation.

Referring back to FIG. 18, the i node information for the snapshot file in the migration destination is reconstructed in the differential volume in the migration-destination end server 104 (s1806). A more detailed description will be given below with reference to FIG. 29.

Figure 29:
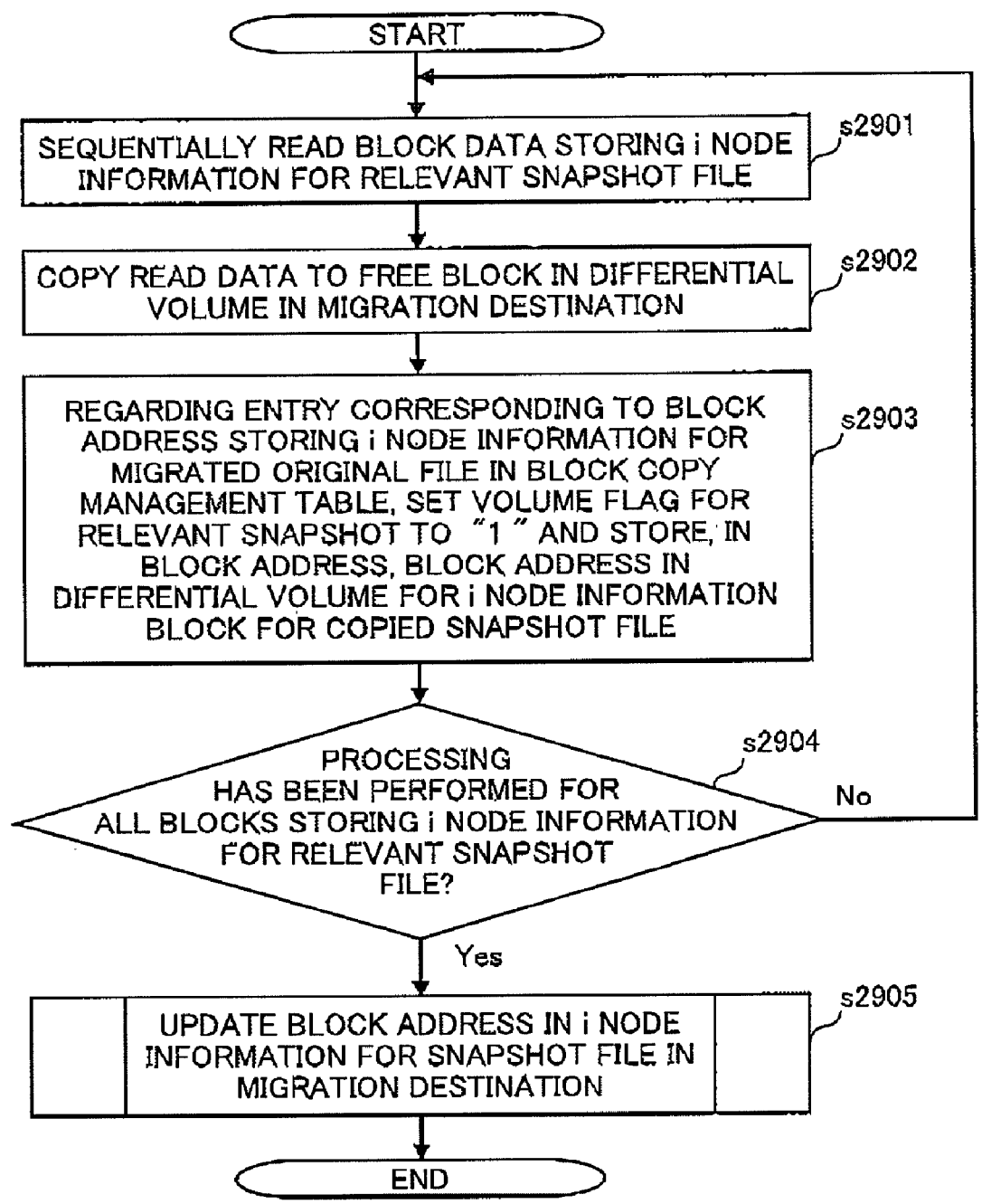
FIG. 29 is an example of a flowchart showing i node information reconstruction processing for a snapshot file in the migration destination in embodiments 1 and 3 in this invention.

FIG. 29 is a flowchart showing an example of processing for reconstructing the i node information for the snapshot file in the migration-destination differential volume. First, the processor 202 in the migration-source end server 104 reads data in the block storing the i node information for the relevant snapshot file in the migration-source end server 104 in accordance with the migration program 402 (s2901) and transmits the read data to the migration-destination end server 104. The migration-destination end server 104 receives the data transmitted from the migration-source end server 104 and copies the received data to a free block in the differential volume in the migration-destination end server 104 based on the processing by the migration program 402 (s2902). At this time, the migration program 402 in the migration-destination refers to the block usage management table 405 in the migration-destination, selects a block with a usage status flag 2402 of "0", copies the received data to the selected block, and then sets the used status flag 2402 for this block address 2401 to "1."

Next, the processor 202 in the migration-destination end server 104 updates the block copy management table 1401 (s2903). Specifically, the processor 202 sets the volume flag 603 of the relevant snapshot to "1," in the entry with the block address 601 of the data block for the i node information of the post-migration original file, which is the data block corresponding to the data block for the copied i node information, and stores in the block address 604 the block address in the differential volume in which the corresponding i node information has been copied.

If the above processing has been performed for the data in all the blocks storing the i node information for the relevant snapshot file (s2904: Yes), the processor 202 updates the block address 2005 of the i node information for the relevant snapshot file (s2905) and terminates the processing in s1806. The processing in s2905 will be described later in detail with reference to FIG. 30. If the processing has not been performed for the data in all the blocks in s2904 (s2904: No), the processor 202 returns to s2901 and repeats the processing.

Figure 30:
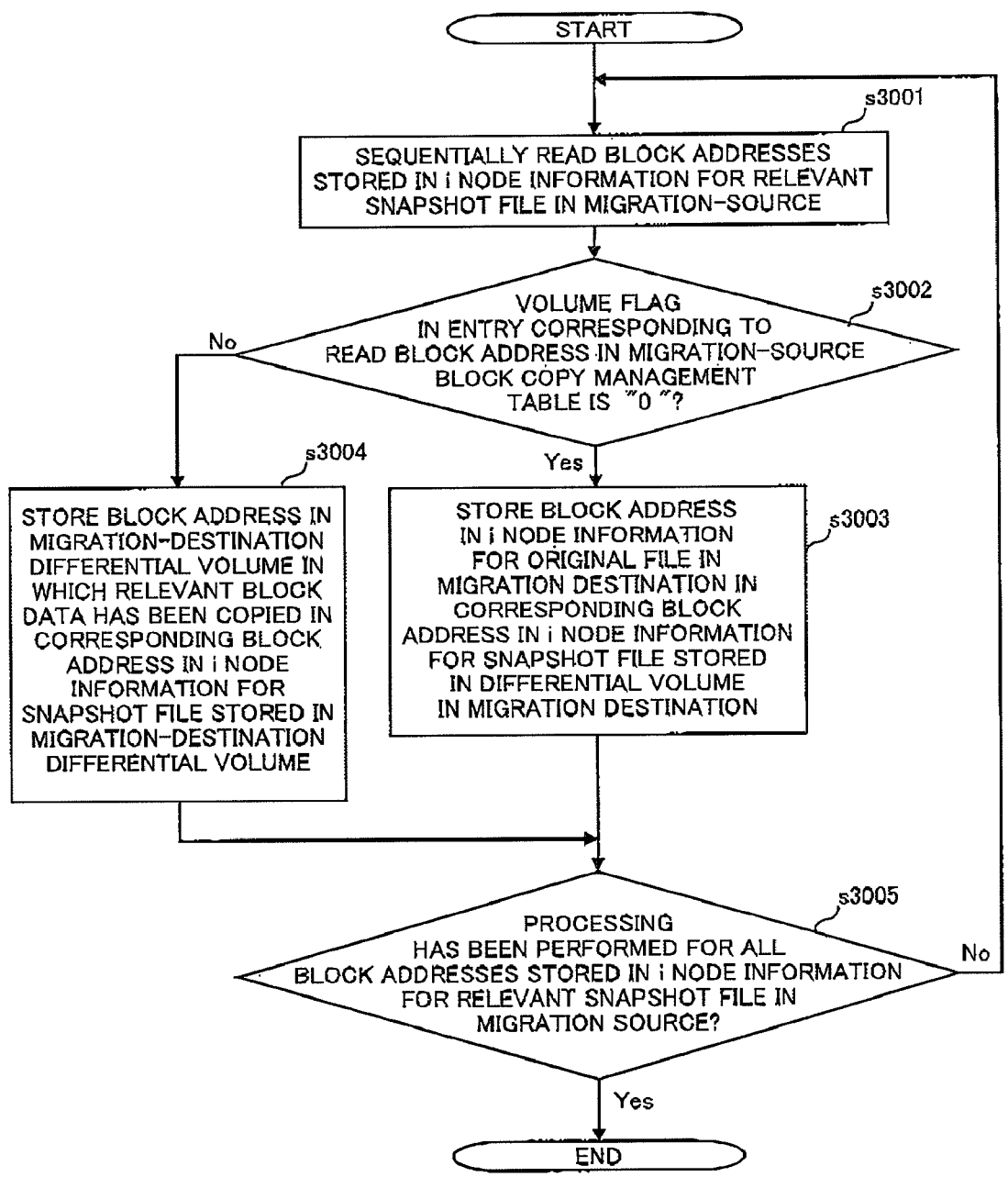
FIG. 30 is an example of a flowchart showing processing for updating a block address for i node information in the snapshot file in the migration destination in embodiments 1 and 3 in this invention.

FIG. 30 is a flowchart showing an example of the processing in s2905 in FIG. 29, i.e., the processing for updating the block address 2005 of the i node information for the snapshot file in the migration destination. First, the processor 202 in the migration-source end server 104 sequentially reads the block addresses 2005 stored in the i node information for the relevant snapshot file (s3001), refers to the block copy management table 404 in the migration-source end server 104, and checks whether or not the volume flag 603 of the relevant snapshot in the entry corresponding to the read block address is "0" (s3002).

The volume flag 603 being "0" indicates that the relevant block data in the relevant snapshot is the data in the original file system, so the migration-source processor 202 stores the corresponding block address 2005 in the i node information in the original file in the migration-destination end server 104 in the corresponding block address 2005 in the i node information for the snapshot file stored in the differential volume in the migration-destination end server 104 (s3003).

The volume flag 603 being "1" indicates that the relevant block data in the relevant snapshot is the data in the differential volume, so the migration-source processor 202 stores the block address in the differential volume in the migration-destination end server 104, in which the data block in the differential volume in the migration-source end server 104 indicated in the relevant block address 604 has been copied, in the relevant block address 2005 in the i node information for the snapshot file stored in the differential volume in the migration-destination end server 104 (s3004).

If the above processing has been performed for all the block addresses 2005 in the i node information in the relevant snapshot file (s3005: Yes), the processing in s2905 is terminated. If the above processing has not been performed for all the block addresses 2005 (s3005: No), the processor 202 returns to s3001 and repeats the processing.

Referring back to FIG. 18, next, an object ID is created from the i node information for the snapshot file reconstructed in the migration-destination end server 104 (s1807). Then the processor 202 in the intermediate server 103 adds an entry containing the migration-source object ID 1201 and the corresponding migration-destination object ID 1202 for the snapshot file to the object ID management table 307, like in s1804 (s1808).

If the processing from s1805 to s1808 has been performed for the snapshots in all generations (s1809: Yes), the intermediate server 103 deletes the data of the migration-target file in the migration source and the differential data for the snapshot of this target file (s1810), and updates the entry corresponding to the deleted data block in the block copy management table 404 in the migration source and the usage status flag 2402 in the block usage management table 405 (s1811)

Specifically, the processor 202 sets "0" in the volume flag 603 and in the block address 604 for each snapshot 602 corresponding to the deleted block address 601 in the block copy management table 404 and sets "0" in the usage status flag 2402 corresponding to the deleted block address 2401 in the block usage management table 405. Then the processor 202 releases the access lock for the relevant file (s1812) and terminates the data migration processing.

On the other hand, if it is determined that the processing has not been performed for the snapshots in all generations in s1809 (s1809: No), the intermediate server 103 returns to s1805, selects a snapshot for which the processing has not been performed and repeats the above processing.

With the above processing, when file-level data is migrated, access can continuously been made to a snapshot for the relevant file even after the data migration.

In this embodiment, the end server 104 or the intermediate server 103 locks the migration-target file and holds access to the target file during the migration in the processing in s1802, but the time the target file is locked may be long depending on the capacity of the snapshot file. Accordingly, when an access request for making any change (e.g., writing) to the target file is received, the data migration processing may be stopped, any changes resulting from the copy may be reversed, and the migration processing may then be restarted again after a certain time period.

In this embodiment, the original file system volume data and the differential volume data are transferred from the migration-source end server 104 to the migration-destination end server 104 via the intermediate server 103, and data for the snapshot volume is reconstructed based on the transferred data in the migration-destination end server 104, and response information containing the reconstructed data is transferred to the client 101. Accordingly, when file-level data is migrated, the client can continuously access the snapshot of the relevant file even after the migration.

Embodiment 2

Embodiment 2 in this invention will be described below with reference to FIGS. 1 to 17, 19 and 25. In embodiment 2, the server in this invention operates as an end server for providing snapshots and migrating file-level data, while an intermediate server holds the object ID management table and distributes accesses to migration-source objects to respective suitable migration destinations.

Embodiment 2 is different from embodiment 1 in that only original file data is migrated and differential data for the original file is not migrated. Accordingly, the intermediate server 103 performs the same processing as that in FIG. 16 for processing a request from the client 101, while performing different processing for migrating file data. In fact, access made to the migrated original file data is transferred to the migration-destination end server 104 by the intermediate server 103 as in embodiment 1, but access made to the snapshot file for the original file is processed by transferring the access request to the migration-source end server 104 like the access made before the migration.

Figure 19:
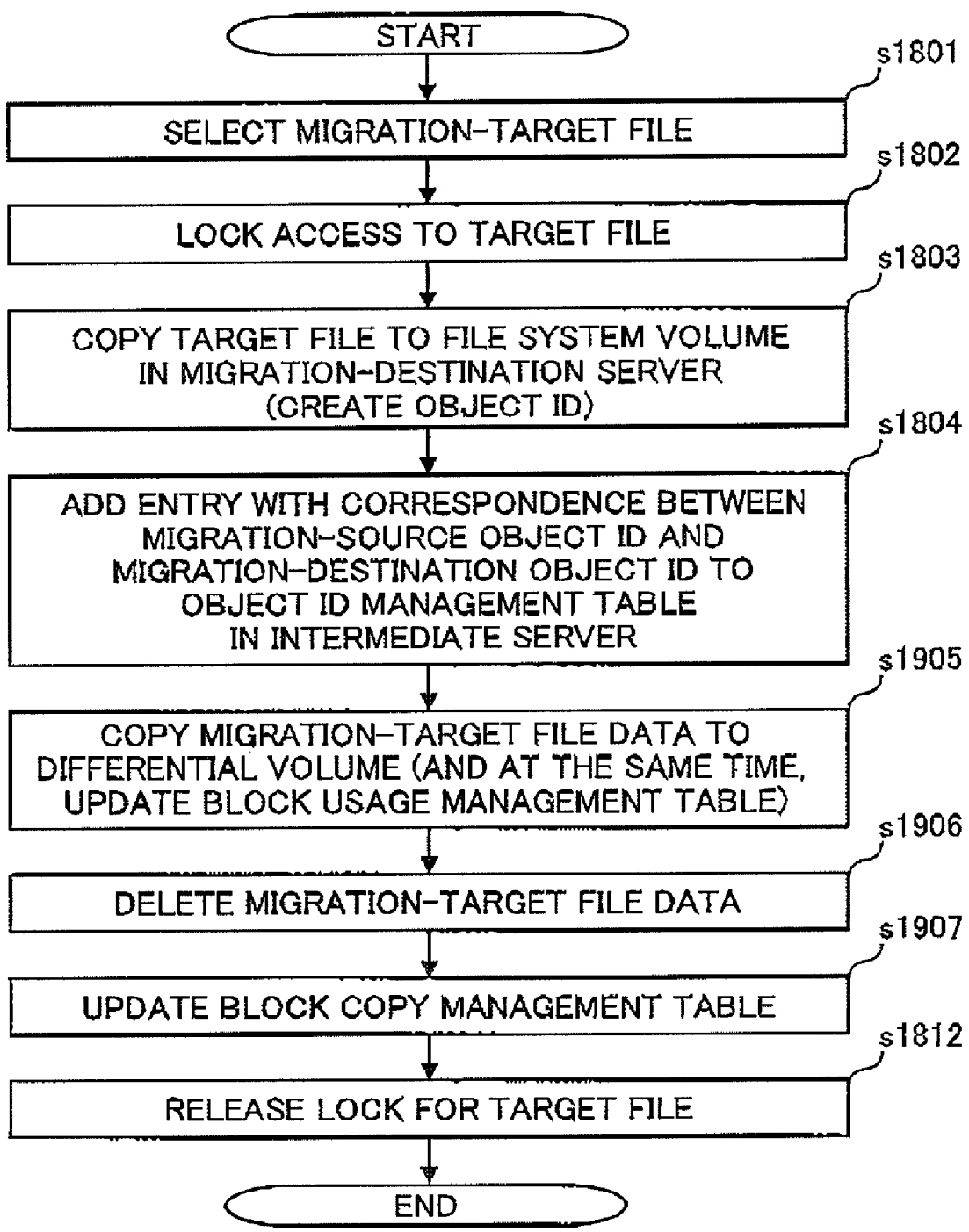
FIG. 19 is a flowchart showing an example of data migration processing in embodiment 2 in this invention.

A processing sequence in embodiment 2 will be described below. FIG. 19 is a flowchart showing an example of migration processing for file data in this embodiment. The processing from s1801 to s1804 is the same as that from s1801 to s1804 in FIG. 18.

Next, the processor 202 in the intermediate server 103 refers to the block usage management table 405, stores the data of the migration-target file in the migration-source end server 104 in free blocks in the differential volume in the migration-source end server 104, i.e., in blocks with a usage status flag 2402 of "0," and sets the usage status flag 2402 to "1" (s1905). Then the processor 202 in the intermediate server 103 deletes the data of the migration-target file (s1906) and updates the block copy management table in the migration-source end server 104 (s1907).

Specifically, for all the snapshots 602 with both a volume flag 603 and block address 604 of "0" in the entry corresponding to the block address 601 of the deleted data, the processor 202 sets the volume flag 603 to "1" and stores in the block address 604 the block address in the differential volume where the relevant data has been stored, then releases the access lock on the relevant file (s1812), and terminates the data migration processing.

With the above processing, when file-level data is migrated, access can continuously be made to the snapshot of the relevant file even after the migration.

In this embodiment, when file-level data is transferred from the migration-source end server 104 to the migration-destination end server 104 via the intermediate server 103, the migration-source end server 104 stores the file-level data in the differential volume 502 in the migration-source end server 104, reconstructs the data of the snapshot volume based on the file-level data and the differential data stored in the differential volume 502 and transfers, as response information, information about the reconstructed data to the client. With this configuration, when the file-level data is migrated, access can be continuously made to the snapshot of the relevant file even after the data migration.

Embodiment 3

In embodiment 3, the intermediate server does not hold the object ID management table; the server in this invention operates as an end server that provides snapshots and migrates file-level data, stores a migration-destination object ID in an extended attribute information area for i node information for a migration-target file and its snapshot file in the migration-source end server; and the migration-source end server retrieves migrated data from the migration-destination end server in response to access to the migration-source object and responds to the intermediate server.

A processing sequence in embodiment 3 will be described below after the description of the drawings. FIGS. 20A and 20B are block diagrams each showing a configuration example of i node information for a file in a migration source in this embodiment.

FIG. 20A shows a configuration example of a file 2001, and the file 2001 includes attribute information 2002, extended attribute information 2003 and data 2004. The i node information is a part consisting of the attribute information 2002 and the extended attribute information 2003. The attribute information 2002 includes an ID for identifying each piece of i node information, and a block address 2005 for a block storing the data 2004, etc. The extended attribute information 2003 is information about an area used for storing information not contained in the attribute information 2002.

FIG. 20B shows a configuration example of a file 2006 when a migration-destination object ID 2007 is stored in the extended attribute information 2003 area. The attribute information 2002 and the data 2004 are the same as in the corresponding parts in FIG. 20A, and the extended attribute information 2003 area in FIG. 20A is replaced with migration-destination object ID 2007 and other extended attribution information 2008 areas.

Figure 21:
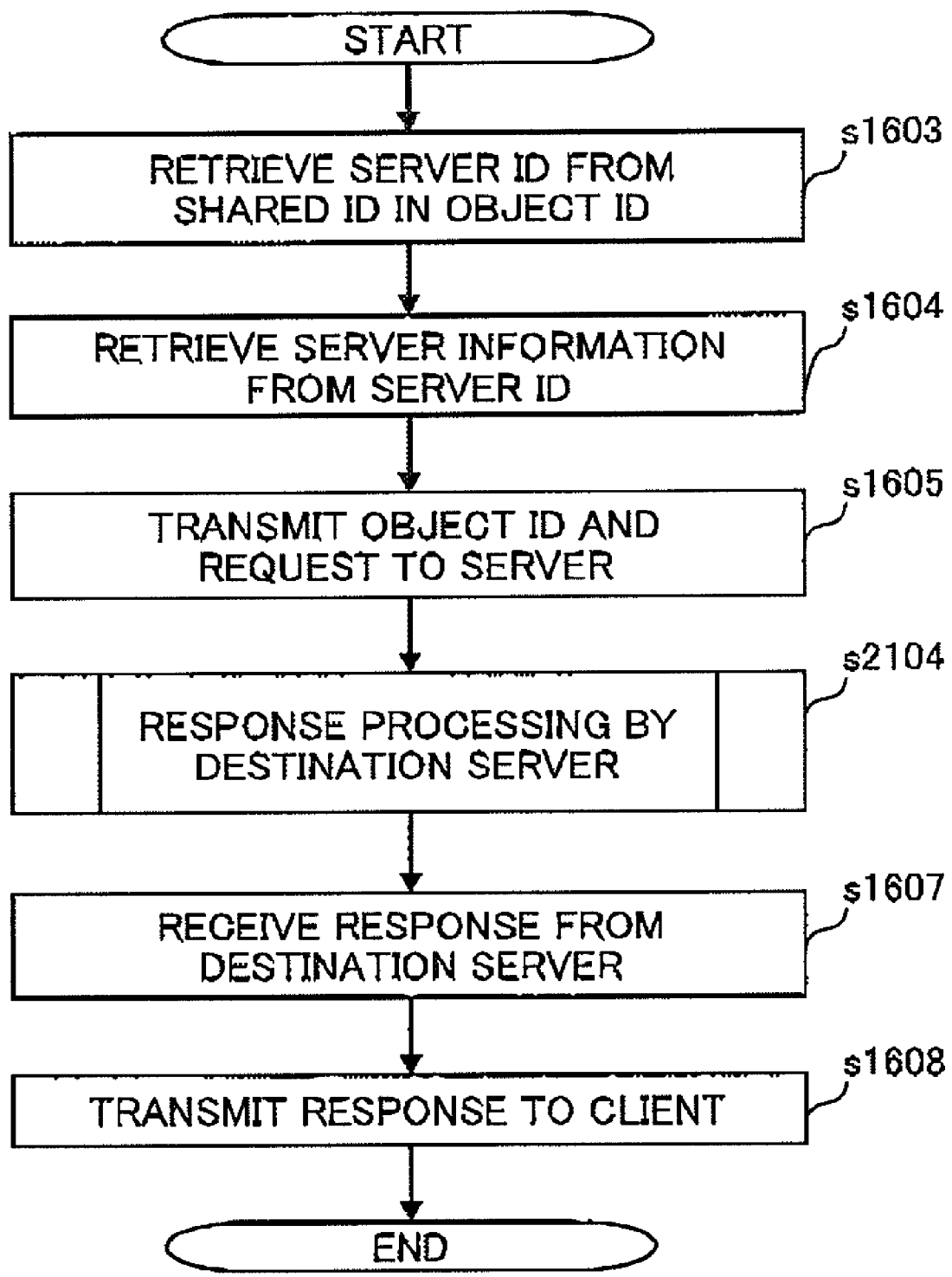
FIG. 21 is an example of a flowchart showing how the intermediate server processes a request from the client in embodiment 3 in this invention.

FIG. 21 is a flowchart showing an example of how the intermediate server 103 processes a request from the client 101 in this embodiment. The processing from s1603 to s1605, s1607 and s1608, excluding response processing performed by the destination server (s2104), is the same as the processing from s1603 to s1605, s1607 and s1608 in FIG. 16, so only the processing in s2104 will be described here.

Figure 22:
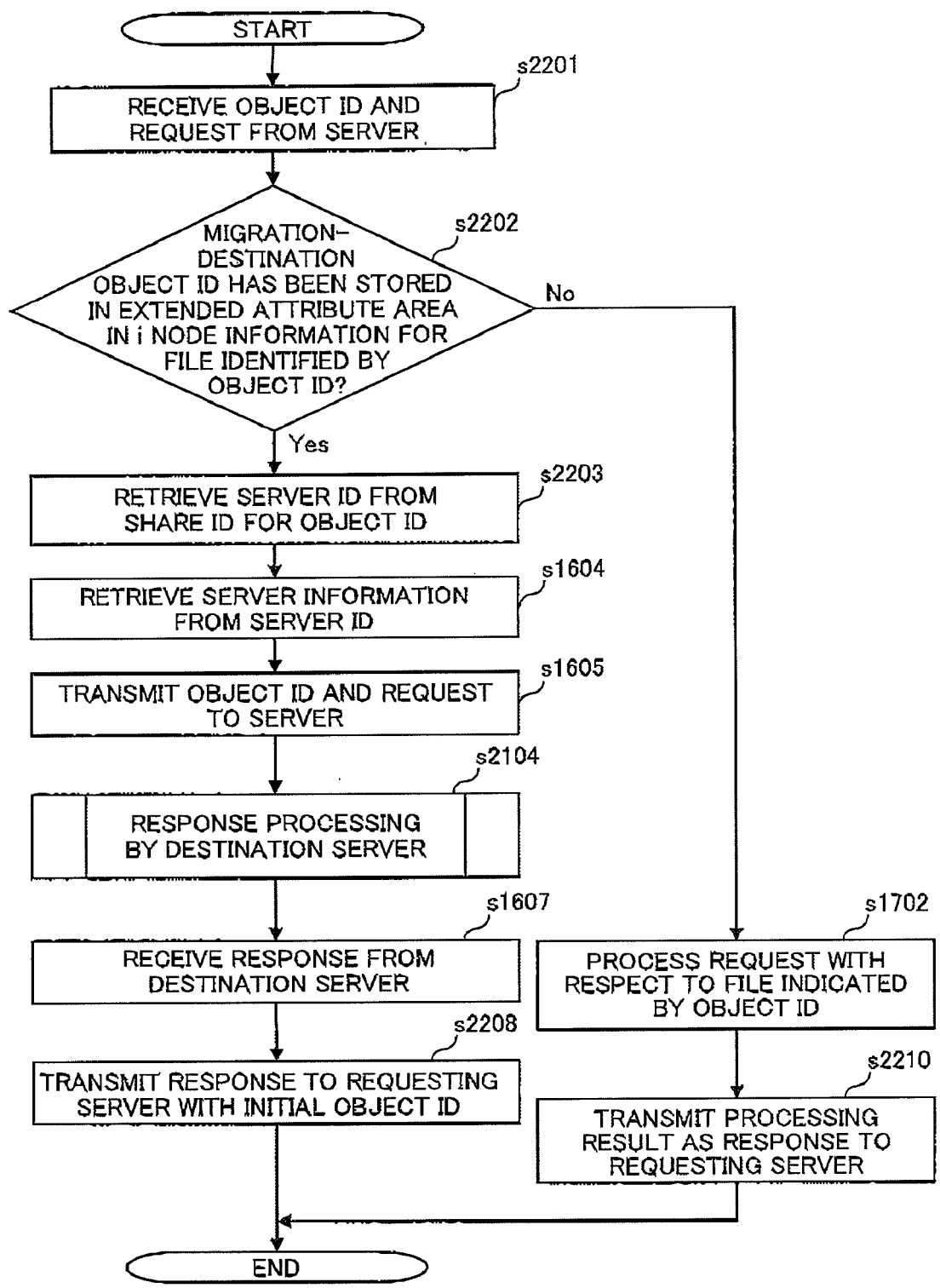
FIG. 22 is an example of a flowchart showing response processing by the destination server in embodiment 3 in this invention.

FIG. 22 is a flowchart showing an example of processing in s2104 in FIG. 21, i.e., the response processing performed by the destination server. This processing is performed by the processors 202 in the migration-destination end server 104 operating the file sharing program 401.

When the end server 104 as a destination server receives an object ID and a request from the intermediate server 103 or another end server 104 (s2201), the file sharing program 401 refers to the extended attribute information 2003 area in the i node information in the file identified by the received object ID and checks whether or not the migration-estimation object ID 2007 is stored (s2002). If the migration-destination object ID 2007 is not stored (s2002: No), the file sharing program 401 identifies a target file from the received object ID and processes this file in accordance with the request (s1702). Here, if the request for the relevant file requests making any change (e.g., writing) to the data, the file sharing program 401 locks access to the relevant file, and then provides the processing result and the object ID to the intermediate server 103 or another end server 104 as a response (s2210) and terminates the processing.

If the migration-destination object ID 2007 is stored (s2202. Yes), the file sharing program 401 retrieves, based on a share ID 901 contained in the migration-destination object ID 2007, a server ID 902 corresponding to the share ID 901 using the share information management table 304 (s2203) and retrieves server information such as the server name 1001 and the IP address 1002 corresponding to the retrieved server ID 902 using the server information management table 305 (s1604). Then the processor 202 transmits the received request and the object ID to a suitable server based on the retrieved server information (s1605).

Next, the response processing by the destination server shown in s2104 is executed. When receiving the response from the destination server (s1607), the processor 202 provides the result received from the destination server and the object ID received in s2201 to the source intermediate server 103 or end server 104 as a response (s2208) and terminates the processing.

Figure 23:
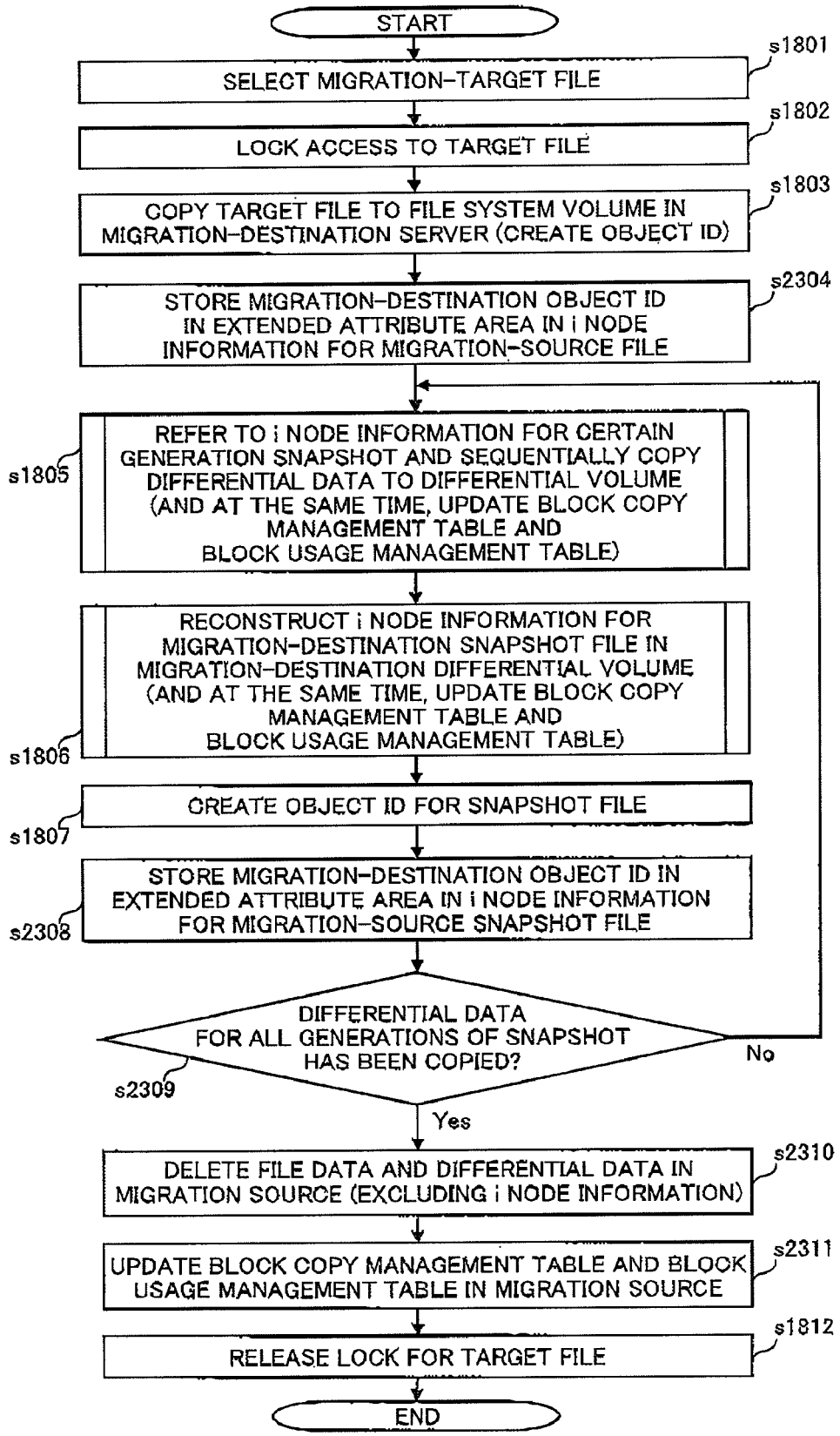
FIG. 23 is an example of a flowchart showing data migration processing in embodiment 3.
Figure 25A:
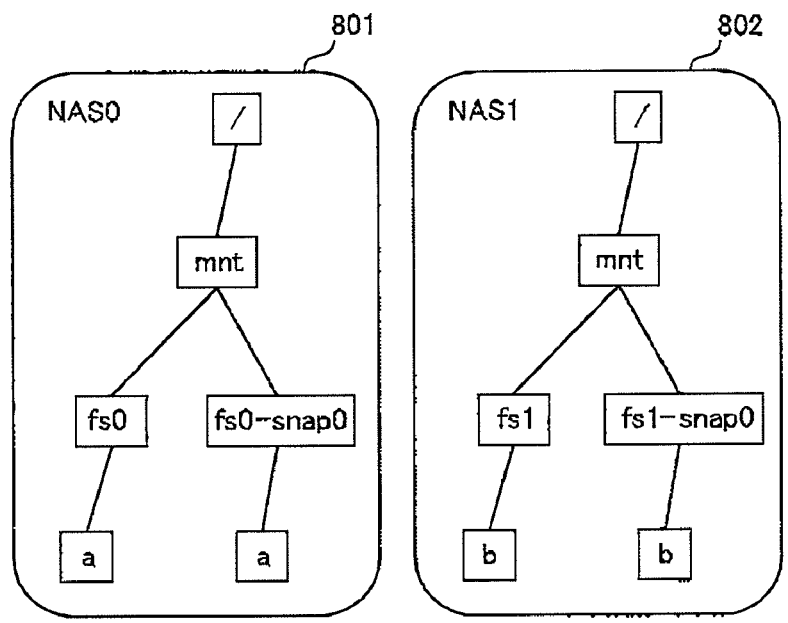
FIGS. 25A and 25B are diagrams respectively showing configuration examples of file data before migration and that after migration in embodiment 2.
Figure 25B:
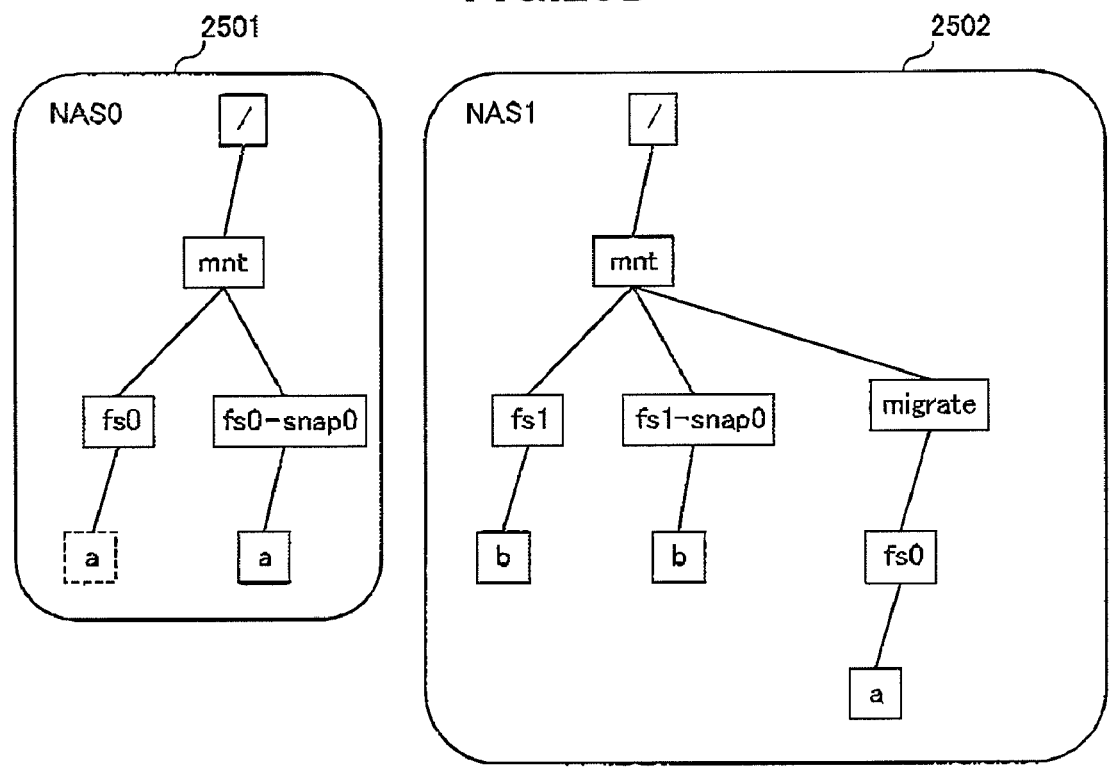

Next, a processing sequence for the data migration processing by the end server 104 will be described. FIG. 23 is a flowchart showing an example of file data migration processing in this embodiment. The processing from s1801 to s1803 is the same as that from s1801 to s1803 in FIG. 18.

Next, the migration program 402 in the migration-source end server 104 commands the migration program 402 in the migration-destination end server 104 to acquire the object ID of the migration-target file and stores the relevant object ID 2008 in the extended attribute information 2003 area in the node information 2001 for the migration-source end server 104 (s2304). The following processing from S1805 to s1807 is the same as that from s1805 to s1807 in FIG. 18.

Next, the migration program 402 in the migration-source end server 104 selects a snapshot, commands the migration program 402 in the migration-destination end server 104 to retrieve the object ID of the snapshot file for the migration-target file, and stores the relevant object ID 2008 in the extended attribute information 2003 area in the i node information 2001 for the snapshot file in the migration-source end server 104 (s2308).

If the processing from s1805 to s2308 has been performed for all generations of the snapshot (s2309; Yes), the migration program 402 in the migration-source end server 104 deletes the migration-target file data in the migration source and the differential data of the snapshot for this target file while leaving the i node information area undeleted (s2310), and updates, regarding the deleted data block, the entry in block copy management table and the usage status flag 2402 in the block usage management table in the migration source (s2311).

Specifically, the migration program 402 in the migration-source end server 104 sets the volume flag 603 and the block address 604 to "0" for each snapshot 602 corresponding to the deleted block address 601 in the block copy management table, sets the usage status flag 2402 corresponding to the deleted block address 2401 in the block usage management table to "0," and then releases the access lock on the target file (s1812), and terminates the data migration processing.

If the processing has not been performed for all the generations of the snapshot in s2309 (s2309: No), the processing returns to s1805 and the above processing is repeated by selecting a snapshot that has not been processed yet.

According to this embodiment, when file-level data is migrated, the client 101 can access the snapshot for the target file continuously and transparently even after the migration.

The present invention can be widely applied in generally-used servers and NAS (Network Attached Storage) apparatuses providing file sharing services and various types of storage apparatuses.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A method for migrating a file from a first server to a second server, comprising:
providing, at the first server, a first file and a snapshot file of the first file which the first server manages, and a first block copy management table, the first block copy management table storing first block addresses in a first volume where data of the first file is stored, first flag information indicating whether differential data is stored in a first differential volume for each of the first block addresses, and a second block address in the first differential volume where the differential data is stored for each of the first block addresses;
providing, at the second server, a second block copy management table, the second block copy management table storing third block addresses in a second volume where data of a second file is stored, second flag information indicating whether differential data is stored in a second differential volume for each of the third block addresses, and a fourth block address in the second differential volume where the differential data is stored for each of the third block addresses;
copying the first file to the second volume;
performing a copy process of the snapshot file of the first file by referring to i node information in the snapshot file for each of the first block addresses, wherein the copy process comprises:
judging if the first flag information is set to a predetermined value in the first block copy management table;
reading differential data from the first differential volume based on the first block copy management table if the first flag information is set to said predetermined value;
copying the differential data from the first differential volume to the second differential volume;

setting the second flag information in the second block copy management table for one of the third block addresses corresponding to the first block address;

writing a block address where the copied differential data is stored in the second differential volume as the fourth block address for the one of the third block addresses corresponding to the first block address, reconstructing the i node information for the snapshot file of the first file in the second differential volume of the second server; and updating the third block addresses stored in the second block copy management table for the i node information for the snapshot file of the first file reconstructed in the second differential volume.

2. A method according to claim 1, wherein the copy process of the snapshot file is performed for each of a plurality of generations of the snapshot file.

3. A method according to claim 2, deleting the first file and the differential data from the first volume and the first differential volume respectively after the copy process of the snapshot file for all of the generations is completed.

4. A storage system, comprising:

a first server which includes a first file and a snapshot file of the first file which the first server manages and a first block copy management table, the first block copy management table storing first block addresses in a first volume where data of the first file is stored, first flag information indicating whether differential data is stored in a first differential volume for each of the first block addresses, and a second block address in the first differential volume where the differential data is stored for each of the first block addresses; and a second server which includes a second block copy management table, the second block copy management table storing third block addresses in a second volume where data of a second file is stored, second flag information indicating whether differential data is stored in a second differential volume for each of the third block addresses, and a fourth block address in the second differential volume where the differential data is stored for each of the third block addresses;

wherein the first server copies the first file to the second volume;

wherein, for each of the first block addresses, the first server performs a first differential data copy process by referring to i node information in the snapshot file for each of the first block addresses, which includes:

judging if the first flag information is set to a predetermined value in the first block copy management table;

reading differential data from the first differential volume based on the first block copy management table if the first flag information is set to said predetermined value;

copying the differential data from the first differential volume to the second differential volume; and wherein the second server performs a second differential copy process which includes:

setting the second flag information in the second block copy management table for one of the third block addresses corresponding to the first block address;

writing a block address where the copied differential data is stored in the second differential volume as the fourth block address for the one of the third block addresses corresponding to the first block address, reconstructing the i node information for the snapshot file of the first file in the second differential volume of the second server; and updating the third block addresses stored in the second block copy management table for the i node information for the snapshot file of the first file reconstructed in the second differential volume.

5. A storage system according to claim 4, wherein the snapshot file has a plurality of generations, wherein the first management table has the first flag information and the second block address for each of the generations, wherein the second management table has the first flag information and the second block address for each of the generations, wherein, for each of the generations, the first server performs the first differential data copy process and the second server performs the second differential data copy process.

6. A storage system according to claim 5, wherein the first server deletes the first file and the differential data from the first volume and the first differential volume respectively after the first differential data copy process and the second differential copy process is completed for all of the generations.

* * * * *